United States Patent
Langvin

(10) Patent No.: US 11,039,657 B2
(45) Date of Patent: *Jun. 22, 2021

(54) DUAL LAYER SOLE SYSTEM WITH AUXETIC STRUCTURE

(71) Applicant: NIKE, Inc., Beaverton, OR (US)

(72) Inventor: Elizabeth Langvin, Sherwood, OR (US)

(73) Assignee: NIKE, Inc., Beaverton, OR (US)

( * ) Notice: Subject to any disclaimer, the term of this patent is extended or adjusted under 35 U.S.C. 154(b) by 135 days.

This patent is subject to a terminal disclaimer.

(21) Appl. No.: 16/256,153

(22) Filed: Jan. 24, 2019

(65) Prior Publication Data
US 2019/0150556 A1 May 23, 2019

Related U.S. Application Data

(63) Continuation of application No. 15/052,275, filed on Feb. 24, 2016, now Pat. No. 10,206,454.

(51) Int. Cl.
| | |
|---|---|
| A43B 13/12 | (2006.01) |
| A43B 1/00 | (2006.01) |
| A43B 3/00 | (2006.01) |
| A43B 13/02 | (2006.01) |
| A43B 13/14 | (2006.01) |
| A43B 13/18 | (2006.01) |
| B32B 3/12 | (2006.01) |

(Continued)

(52) U.S. Cl.
CPC ............ *A43B 13/12* (2013.01); *A43B 1/0009* (2013.01); *A43B 3/0036* (2013.01); *A43B 13/023* (2013.01); *A43B 13/04* (2013.01); *A43B 13/122* (2013.01); *A43B 13/14* (2013.01); *A43B 13/141* (2013.01); *A43B 13/18* (2013.01); *A43B 13/181* (2013.01); *A43B 13/187* (2013.01); *A43B 13/22* (2013.01); *B32B 3/12* (2013.01)

(58) Field of Classification Search
CPC ....... A43B 13/189; A43B 13/20; A43B 13/22; A43B 13/125; A43B 13/187; A43B 13/188; A43B 13/02; A43B 13/223; A43B 13/226; A43B 13/36; A43B 1/0009; A43B 3/0036; A43B 3/24; A43B 3/246
USPC ............ 36/30 R, 30 A, 25 R, 35 B, 102, 28; D2/957, 958, 959, 960
See application file for complete search history.

(56) References Cited

U.S. PATENT DOCUMENTS

| | | | | |
|---|---|---|---|---|
| 7,140,129 | B2 * | 11/2006 | Newson | A43B 5/18 36/100 |
| 8,863,408 | B2 * | 10/2014 | Schindler | A43B 13/20 36/29 |

(Continued)

FOREIGN PATENT DOCUMENTS

| | | |
|---|---|---|
| CN | 101278772 A | 10/2008 |
| CN | 204181024 U | 3/2015 |

*Primary Examiner* — Jameson D Collier
*Assistant Examiner* — F Griffin Hall
(74) *Attorney, Agent, or Firm* — Quinn IP Law

(57) ABSTRACT

A sole structure including a first layer and a second layer is disclosed. The first layer includes a set of apertures arranged in an auxetic configuration that permits the first layer to exhibit a first auxetic behavior. The second layer includes a set of projections arranged in an auxetic configuration that permits the second layer to exhibit a second auxetic behavior. The first layer and the second layer may be joined together in a manner that allows the first auxetic behavior to occur independently of the second auxetic behavior.

14 Claims, 12 Drawing Sheets

(51) Int. Cl.
*A43B 13/04* (2006.01)
*A43B 13/22* (2006.01)

(56) References Cited

U.S. PATENT DOCUMENTS

| | | | |
|---|---|---|---|
| 2005/0097778 A1* | 5/2005 | Willis | B29D 35/06 |
| | | | 36/30 R |
| 2012/0021167 A1* | 1/2012 | Plant | B32B 3/26 |
| | | | 428/116 |
| 2014/0053312 A1* | 2/2014 | Nordstrom | B32B 37/144 |
| | | | 2/69 |

* cited by examiner

DUAL LAYER SOLE SYSTEM WITH AUXETIC STRUCTURE

CROSS REFERENCE TO RELATED APPLICATIONS

The present application is a continuation of U.S. application Ser. No. 15/052,275, published as US 2017/0238652, which is incorporated by reference in its entirety.

BACKGROUND

The present embodiments relate generally to articles of footwear, and in particular to articles of footwear with uppers and sole structures.

Articles of footwear generally include two primary elements: an upper and a sole structure. The upper may be formed from a variety of materials that are stitched or adhesively bonded together to form a void within the footwear for comfortably and securely receiving a foot. The sole structure is secured to a lower portion of the upper and is generally positioned between the foot and the ground. In many articles of footwear, including athletic footwear styles, the sole structure often incorporates an insole, a midsole, and an outsole.

SUMMARY

In one aspect, the present disclosure is directed to a sole system with an article of footwear comprising an upper and a sole system. The sole system comprises a first auxetic layer and a second auxetic layer, where the first auxetic layer includes a pattern of apertures and exhibits a first auxetic behavior, and where the second auxetic layer includes a pattern of projections and exhibits a second auxetic behavior. The first auxetic layer is disposed on a top surface of the second auxetic layer. Furthermore, the pattern of apertures of the first auxetic layer is configured to receive the pattern of projections of the second auxetic layer, and the first auxetic behavior is configured to occur independently of the second auxetic behavior.

In one aspect, the present disclosure is directed to an article of footwear with a sole structure, comprising an upper and a sole structure with an insole and an outsole. The insole includes a bottom surface, where the bottom surface of the insole includes a plurality of apertures. Furthermore, the outsole includes a top surface, where the top surface of the outsole includes plurality of projections. The bottom surface of the insole is disposed adjacent to the top surface of the outsole, such that each projection of the plurality of projections is configured to extend upward and into a corresponding aperture of the plurality of apertures when the bottom surface of the insole is disposed adjacent to the top surface of the outsole. In addition, the insole has a first insole sidewall and a second insole sidewall, where the first insole sidewall is tapered and where the second insole sidewall is tapered. The insole is configured to fit within a cavity of the outsole, wherein the cavity has a first cavity sidewall and a second cavity sidewall, and the first cavity sidewall is tapered and wherein the second cavity sidewall is tapered. The first cavity sidewall is in contact with the first insole sidewall when the insole is disposed in the cavity, and the second cavity sidewall is in contact with the second insole sidewall when the insole is disposed in the cavity. Furthermore, the insole is secured within the article of footwear by the contact between the first insole sidewall and the first cavity sidewall and by the contact between the second insole sidewall and the second cavity sidewall.

In one aspect, the present disclosure is directed to an article of footwear with a sole structure, comprising an upper and a sole structure comprising a first auxetic layer and a second auxetic layer. The sole structure, the first auxetic layer, and the second auxetic layer are characterized by each having a lateral direction and a longitudinal direction. The first auxetic layer includes a pattern of apertures, and is configured to expand in the lateral direction and the longitudinal direction when tension is applied to the sole structure in the lateral direction. Furthermore, the first auxetic layer is configured to expand in the lateral direction and the longitudinal direction when tension is applied to the sole structure in the longitudinal direction. The second auxetic layer includes a pattern of projections, and is configured to expand in the lateral direction and the longitudinal direction when tension is applied to the sole structure in the lateral direction. In addition, the second auxetic layer is configured to expand in the lateral direction and the longitudinal direction when tension is applied to the sole structure in the longitudinal direction. The first auxetic layer is disposed on a top surface of the second auxetic layer. The pattern of apertures includes a first aperture, and the pattern of projections includes a first projection, where the first aperture has an inner surface and wherein the first projection has an outer surface. In addition, the first aperture has a first geometry, and the first projection has a corresponding second geometry. The first aperture is configured to receive the first projection and the outer surface of the first projection is spaced apart from the inner surface of the first aperture when the first projection is received by the first aperture to permit the first aperture and the first projection to expand independently when tension is applied to the sole structure.

Other systems, methods, features, and advantages of the embodiments will be, or will become, apparent to one of ordinary skill in the art upon examination of the following figures and detailed description. It is intended that all such additional systems, methods, features, and advantages be included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
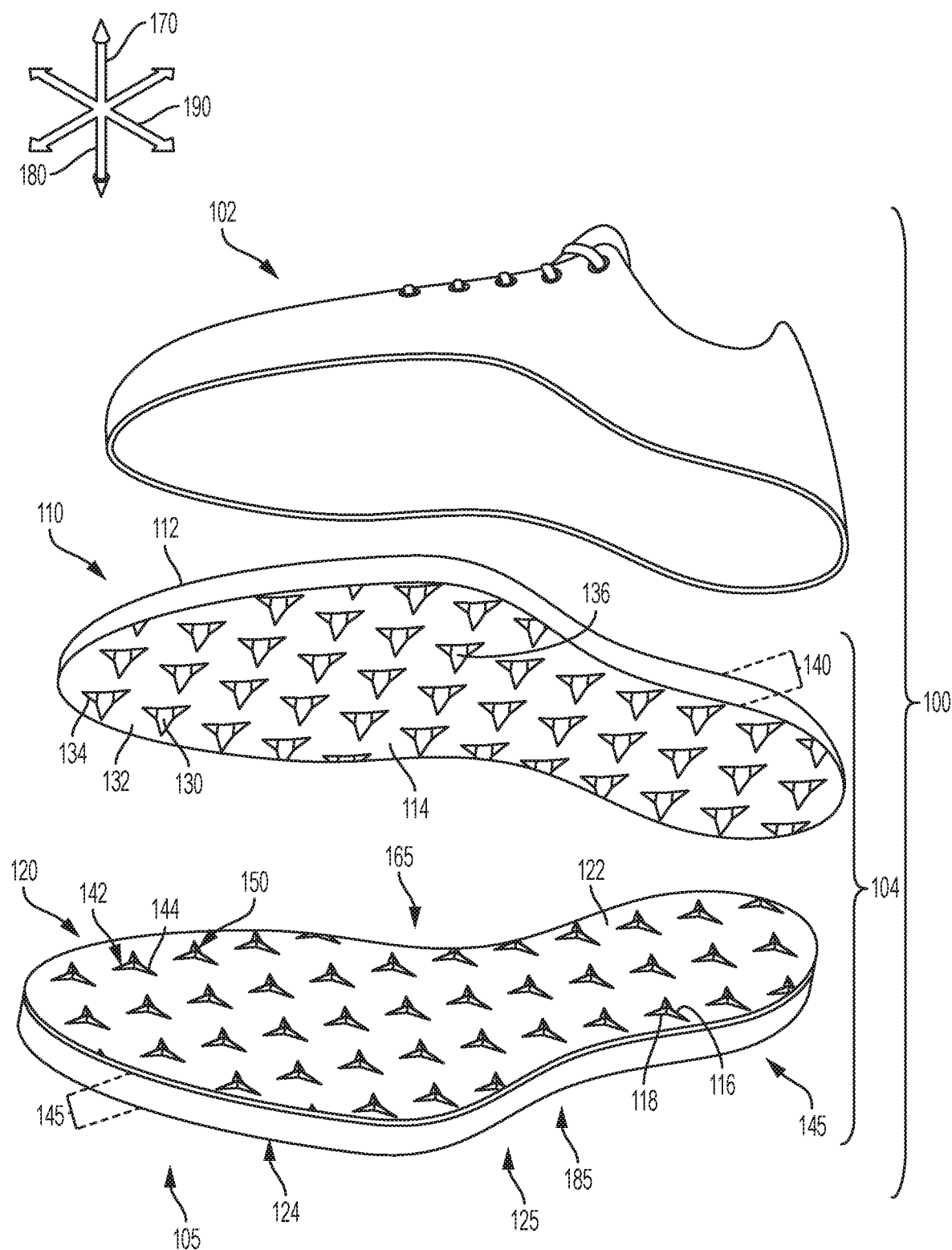
FIG. 1 is an exploded isometric view of an embodiment of an article of footwear, including a sole structure comprised of a first layer and a second layer.

The following discussion and accompanying figures disclose embodiments of a sole structure 104 for an article of footwear 100, as shown in FIG. 1. The provisions discussed herein for the article of footwear and sole structure could be incorporated into various other kinds of footwear including, but not limited to, basketball shoes, hiking boots, soccer shoes, football shoes, sneakers, running shoes, cross-training shoes, rugby shoes, rowing shoes, baseball shoes as well as other kinds of shoes. Moreover, in some embodiments, the provisions discussed herein for article of footwear 100 could be incorporated into various other kinds of non-sports-related footwear, including, but not limited to, slippers, sandals, high-heeled footwear, and loafers. Accordingly, the concepts disclosed herein apply to a wide variety of footwear types.

For purposes of clarity, the following detailed description discusses the features of article of footwear 100, also referred to simply as article 100. However, it will be understood that other embodiments may incorporate a corresponding article of footwear (e.g., a left article of footwear when article 100 is a right article of footwear) that may share some, and possibly all, of the features of article 100 described herein and shown in the figures.

To assist and clarify the subsequent description of various embodiments, various terms are defined herein. Unless otherwise indicated, the following definitions apply throughout this specification (including the claims).

For consistency and convenience, directional adjectives are employed throughout this detailed description corresponding to the illustrated embodiments. The term "longitudinal" as used throughout this detailed description and in the claims refers to a direction extending a length of a component (e.g., an upper or sole component). A longitudinal direction may extend along a longitudinal axis, which itself extends between a forefoot portion and a heel portion of the component. The term "forward" is used to refer to the general direction in which the toes of a foot point, and the term "rearward" is used to refer to the opposite direction, i.e., the direction in which the heel of the foot is facing. The terms forward and rearward may be used to describe the location of elements relative to one another along the sole structure.

In addition, the term "lateral" as used throughout this detailed description and in the claims refers to a direction extending along a width of a component. A lateral direction may extend along a lateral axis, which itself extends between a medial side and a lateral side of a component. In other words, the lateral direction may extend between a medial side and a lateral side of an article of footwear, with the lateral side of the article of footwear being the surface that faces away from the other foot, and the medial side being the surface that faces toward the other foot.

Furthermore, the term "vertical" as used throughout this detailed description and in the claims refers to a direction extending along a vertical axis, which itself is generally perpendicular to a lateral axis and a longitudinal axis. For example, in cases where an article is planted flat on a ground surface, a vertical direction may extend from the ground surface upward. This detailed description makes use of these directional adjectives in describing an article and various components of the article, including an upper, a midsole structure, and/or an outer sole structure.

The term "vertical," as used throughout this detailed description and in the claims, refers to a direction generally perpendicular to both the lateral and longitudinal directions. For example, in cases where a sole is planted flat on a ground surface, the vertical direction may extend from the ground surface upward. It will be understood that each of these directional adjectives may be applied to individual components of a sole. The term "upward" refers to the vertical direction heading away from a ground surface, while the term "downward" refers to the vertical direction heading toward the ground surface. Similarly, the terms "top," "upper" (when not used in context of the upper component in an article of footwear), and other similar terms refer to the portion of an object substantially furthest from the ground in a vertical direction, and the terms "bottom," "lower," and other similar terms refer to the portion of an object substantially closest to the ground in a vertical direction.

The "interior" of a shoe refers to space that is occupied by a wearer's foot when the shoe is worn. The "inner side" of a panel or other shoe element refers to the face of that panel or element that is (or will be) oriented toward the shoe interior in a completed shoe. The "outer side" or "exterior" of an element refers to the face of that element that is (or will be) oriented away from the shoe interior in the completed shoe. In some cases, the inner side of an element may have other elements between that inner side and the interior in the completed shoe. Similarly, an outer side of an element may have other elements between that outer side and the space external to the completed shoe. In addition, the term "proximal" refers to a direction that is nearer a center of a footwear component, or is closer toward a foot when the foot is inserted in the article as it is worn by a user. Likewise, the term "distal" refers to a relative position that is further away from a center of the footwear component or upper. Thus, the terms proximal and distal may be understood to provide generally opposing terms to describe the relative spatial position of a footwear layer.

Furthermore, throughout the following description, the various layers or components of sole structure 104 may be described with reference to a proximal side and a distal side.

In embodiments in which sole structure 104 comprises multiple layers (as will be discussed further below), the proximal side will refer to the surface or side of the specified layer that faces the upper and/or faces toward the foot-receiving interior cavity formed in the article. In addition, the distal side will refer to a side of the layer that is opposite to the proximal side of the layer. In some cases, the distal side of a layer is associated with the outermost surface or side. Thus, a proximal side may be a side of a layer of sole structure 104 that is configured to face upward, toward a foot or a portion of an upper. A distal side may be a surface side of a layer of sole structure 104 that is configured to face toward a ground surface during use of the article.

For purposes of this disclosure, the foregoing directional terms, when used in reference to an article of footwear, shall refer to the article of footwear when sitting in an upright position, with the sole facing groundward, that is, as it would be positioned when worn by a wearer standing on a substantially level surface.

In addition, for purposes of this disclosure, the term "fixedly attached" shall refer to two components joined in a manner such that the components may not be readily separated (for example, without destroying one or both of the components). Exemplary modalities of fixed attachment may include joining with permanent adhesive, rivets, stitches, nails, staples, welding or other thermal bonding, or other joining techniques. In addition, two components may be "fixedly attached" by virtue of being integrally formed, for example, in a molding process.

For purposes of this disclosure, the term "removably attached" or "removably inserted" shall refer to the joining of two components or a component and an element in a manner such that the two components are secured together, but may be readily detached from one another. Examples of removable attachment mechanisms may include hook and loop fasteners, friction fit connections, interference fit connections, threaded connectors, cam-locking connectors, compression of one material with another, and other such readily detachable connectors.

FIG. 1 is an exploded isometric view of an embodiment of article of footwear 100. As noted above, for consistency and convenience, directional adjectives are employed throughout this detailed description. Article 100 may be divided into three general regions along a longitudinal axis 180: a forefoot portion 105, a midfoot portion 125, and a heel portion 145. Forefoot portion 105 generally includes portions of article 100 corresponding with the toes and the joints connecting the metatarsals with the phalanges. Midfoot portion 125 generally includes portions of article 100 corresponding with an arch area of the foot. Heel portion 145 generally corresponds with rear portions of the foot, including the calcaneus bone. Forefoot portion 105, midfoot portion 125, and heel portion 145 are not intended to demarcate precise areas of article 100. Rather, forefoot portion 105, midfoot portion 125, and heel portion 145 are intended to represent general relative areas of article 100 to aid in the following discussion. Since various features of article 100 extend beyond one region of article 100, the terms forefoot portion 105, midfoot portion 125, and heel portion 145 apply not only to article 100 but also to the various features of article 100.

Referring to FIG. 1, for reference purposes, a lateral axis 190 of article 100, and any components related to article 100, may extend between a medial side 165 and a lateral side 185 of the foot. Additionally, in some embodiments, longitudinal axis 180 may extend from forefoot portion 105 to heel portion 145. It will be understood that each of these directional adjectives may also be applied to individual components of an article of footwear, such as an upper and/or a sole member. In addition, a vertical axis 170 refers to the axis perpendicular to a horizontal surface defined by longitudinal axis 180 and lateral axis 190.

Article 100 may include an upper 102 and sole structure 104. Generally, upper 102 may be any type of upper. In particular, upper 102 may have any design, shape, size, and/or color. For example, in embodiments where article 100 is a basketball shoe, upper 102 could be a high-top upper that is shaped to provide high support on an ankle. In embodiments where article 100 is a running shoe, upper 102 could be a low-top upper.

An upper could be formed from a variety of different manufacturing techniques resulting in various kinds of upper structures. For example, in some embodiments, an upper could have a braided construction, a knitted (e.g., warp-knitted) construction or some other woven construction. In an exemplary embodiment, upper 102 may be a knitted upper. As shown in FIG. 1, upper 102 may include one or more material elements (for example, meshes, textiles, knit, braid, foam, leather, and synthetic leather), which may be joined to define an interior void configured to receive a foot of a wearer. The material elements may be selected and arranged to impart properties such as light weight, durability, air permeability, wear resistance, flexibility, and comfort. Upper 102 may include an opening through which a foot of a wearer may be received into the interior void.

In some embodiments, upper 102 may also include a tongue (not shown) that provides cushioning and support across the instep of the foot. Some embodiments may include fastening provisions, including, but not limited to, laces, cables, straps, buttons, zippers as well as any other provisions known in the art for fastening articles. In some embodiments, a lace may be applied at a fastening region of upper 102.

Some embodiments may include uppers that extend beneath the foot, thereby providing 360-coverage at some regions of the foot. However, other embodiments need not include uppers that extend beneath the foot. In other embodiments, for example, an upper could have a lower periphery joined with a sole structure and/or sock liner.

At least a portion of sole structure 104 may be fixedly attached to upper 102 (for example, with adhesive, stitching, welding, or other suitable techniques) and may have a configuration that extends between upper 102 and the ground. Sole structure 104 may include provisions for attenuating ground reaction forces (that is, cushioning and stabilizing the foot during vertical and horizontal loading). In addition, sole structure 104 may be configured to provide traction, impart stability, and control or limit various foot motions, such as pronation, supination, or other motions.

In some embodiments, sole structure 104 may be configured to provide traction for article 100. In addition to providing traction, sole structure 104 may attenuate ground reaction forces when compressed between the foot and the ground during walking, running, or other ambulatory activities. The configuration of sole structure 104 may vary significantly in different embodiments to include a variety of conventional or non-conventional structures. In some cases, the configuration of sole structure 104 can be configured according to one or more types of ground surfaces on which sole structure 104 may be used.

For example, the disclosed concepts may be applicable to footwear configured for use on any of a variety of surfaces, including indoor surfaces or outdoor surfaces. The configuration of sole structure 104 may vary based on the properties and conditions of the surfaces on which article 100 is anticipated to be used. For example, sole structure 104 may vary depending on whether the surface is hard or soft. In addition, sole structure 104 may be tailored for use in wet or dry conditions. Furthermore, sole structure 104 may be configured differently for use on different surfaces for different event types, such as for hard indoor surfaces (such as hardwood); soft, natural turf surfaces; or on hard, artificial turf surfaces. In some embodiments, sole structure 104 may be configured for use on multiple different surfaces.

In some embodiments, sole structure 104 may be configured for a particularly specialized athletic activity or event. Accordingly, in some embodiments, sole structure 104 may be configured to provide support, cushioning, rigidity, stability, and/or traction for a specific plantar pressure or usage type. Furthermore, a sole structure can include provisions for distributing forces throughout different portions of the sole structure. In some embodiments, a sole structure may include provisions for forming a sole system with multiple layers that can be customized, tailored, or otherwise configured to provide particular cushioning effects and responses while maintaining a high degree of stability.

In different embodiments, sole structure 104 may include multiple layers, which may individually or collectively provide article 100 with a number of attributes, such as support, rigidity, flexibility, stability, cushioning, comfort, reduced weight, or other attributes. In some embodiments, a sole system of sole structure 104 may be a layered structure. For purposes of this disclosure, a sole layer or "layer" refers to a segment or portion of the sole structure that extends along a horizontal direction or is disposed within a substantially similar level of the sole structure. In one embodiment, the layer can be likened to a stratum in the earth, for example. In other words, a layer can be a horizontally arranged section of the sole structure that can be disposed above, between, or below other adjacent layers of materials. Each layer can incorporate one or more portions of increased or decreased expansion properties relative to other layers in sole structure 104. In some embodiments, a layer may comprise various structural features that enhance cushioning or support for a wearer. In other embodiments, a layer may comprise materials or a geometry configured to improve distribution of forces applied along the sole structure. Furthermore, a layer may include one or more protruding portions or projections that extend proximally (i.e., upward) or distally (i.e., downward) in some embodiments. In addition, a layer may include one or more apertures or recesses in some embodiments, as will be discussed further below.

Thus, in some embodiments, sole structure 104 is secured to upper 102 and extends between the foot and the ground when article 100 is worn. In different embodiments, sole structure 104 may include different components or layers, such as a ground-contacting outsole, a midsole, an insole, and/or another sole member. In some cases, one or more of these components may be optional. In some embodiments, an outsole may bear a tread pattern, or may have cleats, spikes or other ground-engaging protuberances.

In the embodiment of FIG. 1, sole structure 104 has two major components: a first layer 110 and a second layer 120. In one embodiment, first layer 110 can be an insole or a midsole for article 100. In different embodiments, an insole component or midsole component may generally incorporate various provisions associated with insoles or midsoles. For example, in one embodiment, an insole or midsole may be formed from a polymer foam material that attenuates ground reaction forces (i.e., provides cushioning) during walking, running, and other ambulatory activities. In various embodiments, insole or midsole components may also include fluid-filled chambers, plates, moderators, or other elements that further attenuate forces, enhance stability, or influence the motions of the foot, for example.

In different embodiments, second layer 120 can be an outsole for article 100. In some embodiments, the densities of an outsole and/or a midsole component could vary. In some embodiments, second layer 120 may have a higher density than a midsole component, thereby allowing for increased durability and wear resistance for second layer 120. In other embodiments, however, the density of second layer 120 could be equal to the density of the midsole component, or could be less than the density of the midsole component. Furthermore, in some embodiments, first layer 110 may have a decreased rigidity or stiffness relative to the material comprising second layer 120 in order to provide greater cushioning to a foot in the layer disposed relatively nearer to the foot when article 100 is worn. In other embodiments, the rigidity of first layer 110 and second layer 120 may be substantially similar.

An outsole, as shown in second layer 120, could be manufactured from a variety of different materials. Exemplary materials include, but are not limited to, rubber (e.g., carbon rubber or blown rubber), polymers, thermoplastics (e.g., thermoplastic polyurethane), as well as possibly other materials. In contrast, midsole components (such as first layer 110) may generally be manufactured from polyurethane, polyurethane foam, other kinds of foams as well as possibly other materials. It will be understood that the type of materials for outsoles and midsole (or insole) components could be selected according to various factors including manufacturing requirements and desired performance characteristics. In an exemplary embodiment, suitable materials for outsoles and midsoles could be selected to ensure an outsole has a larger coefficient of friction than a midsole.

In the embodiment of FIG. 1, first layer 110 is positioned above second layer 120. In particular, first layer 110 is positioned between a substantial majority of upper 102 and second layer 120, such that first layer 110 is disposed nearer to upper 102 relative to second layer 120. Thus, it will be understood that first layer 110 is positioned inwardly (or proximally) of second layer 120, with the inward direction being directed inwardly toward an interior cavity of article of footwear 100. However, in other embodiments, second layer 120 may be positioned inwardly of first layer 110, or first layer 110 may comprise an outsole of article 100.

In the embodiment shown in FIG. 1, for purposes of reference, first layer 110 includes a first proximal side 112 and a first distal side 114 that is disposed opposite of first proximal side 112. Similarly, second layer 120 includes a second proximal side 122 and a second distal side 124 that is disposed opposite of second proximal side 122.

In some embodiments, first layer 110 includes a plurality of apertures 130 (also referred to simply as apertures 130). Apertures 130 can be arranged along forefoot portion 105, midfoot portion 125, and heel portion 145 of second layer 120 in some embodiments. However, in other embodiments, apertures 130 may be arranged in only particular regions of portions of second layer 120. For example, apertures 130 may only be formed along forefoot portion 105 and heel portion 145 in one embodiment.

Generally, apertures 130 can comprise various openings or holes arranged in a variety of orientations and in a variety of locations on or through first layer 110. For example, as shown in FIG. 1, in some embodiments, first layer 110 may include apertures 130 that extend in a direction generally aligned with vertical axis 170 through a first thickness 140 of first layer 110. In some embodiments, apertures 130 may be understood to begin from a distal end 136 on first distal side 114 and extend upward toward first proximal side 112 to a proximal end (not shown). Thus, apertures 130 include a series of openings (i.e., holes, gaps, or breaks) along an exterior surface of first layer 110 in some cases. In FIG. 1, first distal side 114 comprises the exterior surface in which the series of openings (shown in greater detail in FIGS. 2 and 3 below) are formed. As will be discussed further below with respect to FIGS. 8-11, apertures 130 may extend from an initial opening associated with distal end 136 (formed along an exterior surface of first distal side 114), through first thickness 140 of first layer 110, to form tunneled spaces comprising varying sizes and lengths.

In some embodiments, plurality of apertures 130 could include polygonal apertures. For example, one or more apertures 130 could have a polygonal cross-sectional shape (where the cross section is taken along a plane parallel with a surface of first layer 110). In other embodiments, however, each aperture could have any other geometry, including geometries with non-linear edges that connect adjacent vertices. In the embodiment shown in FIG. 1, apertures 130 appear as three-pointed stars (also referred to herein as triangular stars or as tri-stars), surrounded by a first plurality of sole elements 132 (also referred to simply as first sole elements 132). In this exemplary embodiment, sole elements 132 are triangular. In other embodiments, the apertures may have other geometries and may be surrounded by sole elements having other geometries. For example, the sole elements may be geometric features. The triangular features of sole elements 132 shown in FIG. 1 are one example of such geometric features. Other examples of geometric features that might be used as sole elements are quadrilateral features, trapezoidal features, pentagonal features, hexagonal features, octagonal features, oval features, and circular features. In the embodiment shown in FIG. 1, the joints at vertices 134 function as hinges, allowing the triangular sole elements 132 to rotate as the sole is placed under tension. When a portion of the sole is under tension, this action allows the portion of the sole under tension to expand both in the direction under tension and in the direction in the plane of the sole that is orthogonal to the direction under tension. In some embodiments, first layer 110 may have an auxetic structure, as will be discussed with respect to FIGS. 2 and 3.

Furthermore, as shown in FIG. 1, second layer 120 may include a plurality of upwardly pointing or upwardly facing projections 150 in some embodiments. Projections 150 can be arranged along forefoot portion 105, midfoot portion 125, and heel portion 145 of second layer 120 in some embodiments. However, in other embodiments, projections 150 may be arranged in only particular regions of portions of second layer 120. For example, projections 150 may only be formed along forefoot portion 105 and heel portion 145 in one embodiment.

In some embodiments, one or more projections 150 can be dimensioned to enter into and/or be received by apertures 130 in a corresponding section of first distal side 114 of first layer 110. In some embodiments, the outer surface shape of projections 150 can be shaped to generally match the shape of a perimeter defining a portion of a corresponding aperture. For example, in one embodiment, the shape of projections 150 can be shaped to match the shape of distal end 136 of apertures 130. The corresponding patterns that may be formed between first layer 110 and second layer 120 will be discussed further with respect to FIGS. 6-11.

In some embodiments, at least some portions of second layer 120 are made of a thin, flexible, resilient, and stretchable material that can stretch, flex, and bend as first layer 110 flexes, compresses, and/or bends. Projections 150 may be hollow in some embodiments (see FIG. 16), such that they can readily close or open up as first layer 110 bends and flexes. In the embodiment of FIG. 1, second layer 120 has a structure formed of a second plurality of sole elements ("second sole elements") 142 that are joined at their vertices 144. In some embodiments, second layer 120 may have an auxetic structure, as will be discussed with respect to FIGS. 4 and 5. In one embodiment, second sole elements 142 and vertices 144 match the corresponding first sole elements 132 and vertices 134 in first layer 110. Vertices 134 and vertices 144 can function as hinges, allowing adjoining first sole elements 132 in first layer 110 and second sole elements 142 in second layer 120 to rotate with respect to each other, and thus allow some expansion of the material in a direction that is orthogonal to the direction under tension. In this embodiment, projections 150 have a substantially three-pointed star (or tri-star) cross-sectional shape over their entire height, extending from a base 118 and culminating in an apex 116 (further discussed in FIGS. 4 and 5 below). However, in other embodiments, projections 150 can comprise any polygonal cross-sectional shapes (where the cross section is taken along a plane parallel with a surface of second layer 120).

In some embodiments, one sole layer may vary in thickness with respect to a second sole layer. In different embodiments, first layer 110 may be thicker than second layer 120. For example, first layer 110 has first thickness 140, and second layer 120 has second thickness 145. In some cases, first thickness 140 is greater than second thickness 145 to help provide additional cushioning to a wearer.

Figure 2:
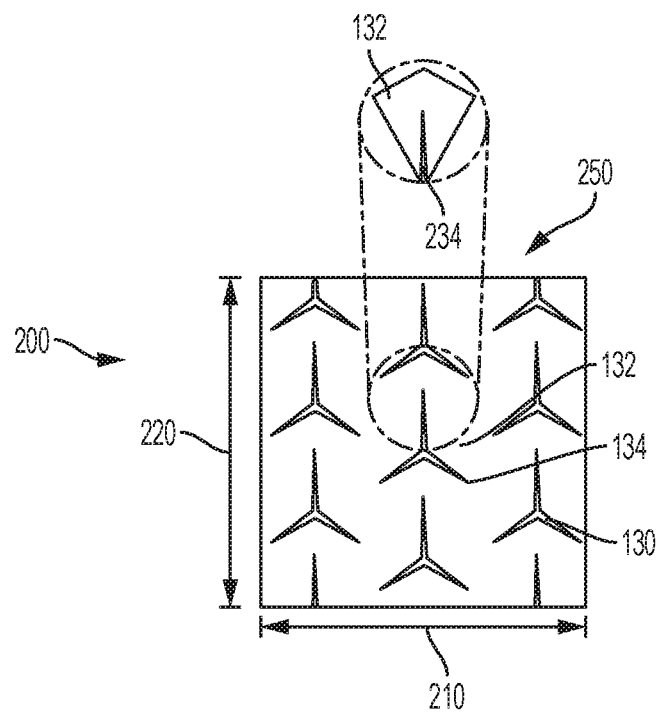
FIG. 2 is a schematic illustration of an embodiment of a portion of an auxetic material in an initial state.
Figure 3:
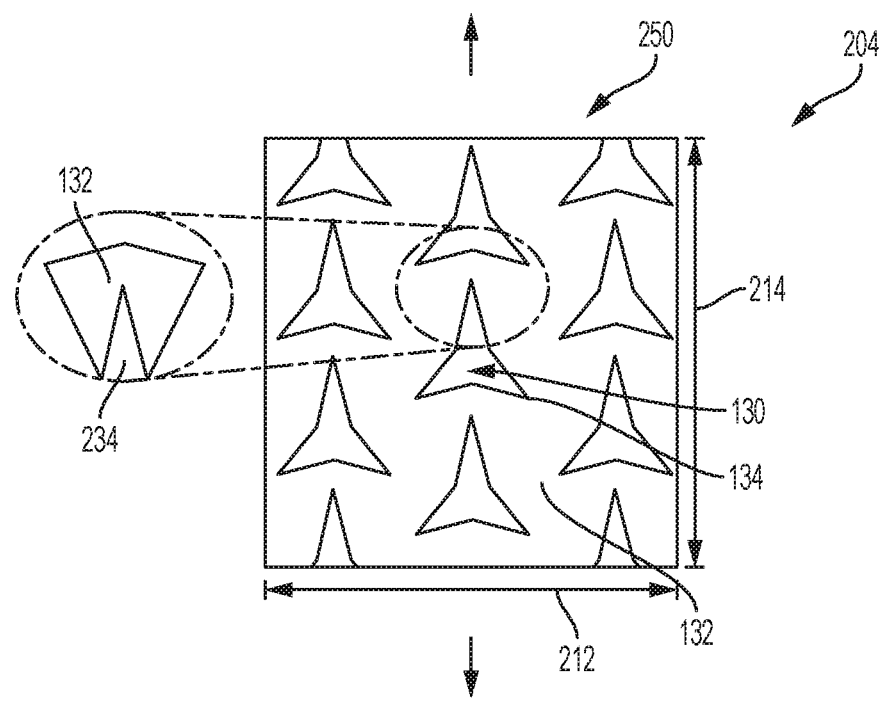
FIG. 3 is a schematic illustration of an embodiment of a portion of an auxetic material when tension is applied in a given direction.

Embodiments can include provisions to facilitate expansion and/or adaptability of a sole structure during dynamic motions. In some embodiments, a sole structure may be configured with auxetic provisions. In particular, one or more layers or components of the sole structure may be capable of undergoing auxetic motions (e.g., expansion and/or contraction). Structures that expand in a direction orthogonal to the direction under tension, as well as in the direction under tension, are known as auxetic structures. In order to provide the reader with a greater understanding of some of the disclosed embodiments, FIGS. 2 and 3 show schematically how the geometries of apertures 130 and their surrounding first sole elements 132 may result in a first type of auxetic behavior ("first behavior") of a portion of a first auxetic material 250 that forms first layer 110 (see FIG. 1). FIGS. 2 and 3 illustrate the bi-directional expansion of a portion of first auxetic material 250 when it is under tension in one direction. FIG. 2 shows portion of first auxetic material 250 that has an initial width 210 and an initial length 220 in an initial (unstressed) state 200. In its unstressed state, the portion of first auxetic material 250 has apertures 130 surrounded by first sole elements 132. Each pair of first sole elements 132 are joined at their vertices 134, leaving a plurality of openings ("openings") 234. In the embodiment shown in FIG. 2, apertures 130 are triangular star-shaped apertures, first sole elements 132 are generally triangular features, and openings 234 represent the interior of triangular star-shaped apertures 130. As best shown in the magnified view, in one embodiment, openings 234 may be characterized as having a relatively small acute angle when the portion of first auxetic material 250 is not under tension.

FIGS. 2 and 3 further provide a comparison of a portion of an embodiment of first auxetic material 250 in its unstressed, initial state 200 (shown in FIG. 2) to first auxetic material 250 when it is under tension in a lengthwise direction (as shown in FIG. 3), in stressed state or resultant state 204. In FIG. 3, the application of tension in the direction shown by the arrows to first auxetic material 250 rotates adjacent first sole elements 132, which increases the relative spacing between adjacent first sole elements 132. For example, as seen in FIGS. 2 and 3, the relative spacing between adjoining sole elements 132 (and thus the size of apertures 130) increases with the application of tension. Because the increase in relative spacing occurs in all directions (due to the geometry of the original geometric pattern of apertures), this results in an expansion of the auxetic material along both the direction under tension, and along the direction orthogonal to the direction under tension. For example, in the embodiment shown in FIG. 2, in initial state 200, first auxetic material 250 has initial length 220 along one direction (e.g., the longitudinal direction) and an initial width 210 along a second direction that is orthogonal to the first direction (e.g., the lateral direction). In stressed state or resultant state 204 (seen in FIG. 3), first auxetic material 250 has an increased resultant length 214 in the direction under tension and an increased resultant width 212 in the direction that is orthogonal to the direction under tension. It can be understood that the expansion of first auxetic material 250 is not limited to expansion in the direction under tension.

Thus, in some embodiments, sole structure 104 of FIG. 1 can have an auxetic layer that exhibits a first auxetic behavior that can function as an insole or midsole. In one embodiment, the auxetic layer can comprise the midsole in the sole structure that provides cushioning and absorbs impact forces when the article of footwear strikes the ground.

Although apertures 130 are shown in FIGS. 1-3 as having the shape of a three-pointed star, in general, each aperture in plurality of apertures 130 may have any kind of geometry in different embodiments. In some embodiments, an aperture may have a polygonal geometry, including a convex and/or concave polygonal geometry. In many cases, the geometry of the aperture may be characterized as a polygon with inwardly pointing sides. For example, in the embodiment shown in FIGS. 1-3, the geometry of apertures 130 can be characterized as a triangle with sides that, instead of being straight, have an inwardly pointing vertex at the midpoint of the side. The angles formed by these inwardly pointing vertices are termed "reentrant" angles. The reentrant angle formed at these inwardly pointing vertices may range from 179 degrees (when the side is almost straight) to, for example, 120 degrees or less.

Other geometries are also possible, including a variety of polygonal and/or curved geometries. Exemplary polygonal shapes that may be used with one or more of apertures 130 include, but are not limited to, regular polygonal shapes (e.g., triangular, rectangular, pentagonal, hexagonal, etc.) as well as irregular polygonal shapes or non-polygonal shapes. Other geometries could be described as being quadrilateral, pentagonal, hexagonal, heptagonal, and octagonal or other polygonal shapes with reentrant sides, or may even have inwardly curving sides. As noted above, the sole elements defining the apertures may be geometric features such as triangular features, quadrilateral features, trapezoidal features, hexagonal features, octagonal features, oval features, and circular features.

Although the embodiments shown in the figures are shown as having apertures with approximately polygonal geometries, including approximately point-like vertices at which adjoining sides or edges connect, in other embodiments some or all of an aperture could be non-polygonal. In particular, in some cases, the outer edges or sides of some or all of an aperture may not be joined at vertices, but may be continuously curved. For example, the apertures may have three vertices with three inwardly curved sides joining the three vertices. Moreover, some embodiments can include apertures having a geometry that includes both straight edges connected via vertices as well as curved or non-linear edges without any points or vertices.

In the embodiments shown in the figures, an auxetic structure, including an insole or midsole that includes an auxetic layer, may be tensioned in the longitudinal direction or in the lateral direction. However, the configuration discussed in this application for auxetic structures comprised of geometric apertures surrounded by geometric portions provides a structure that can expand along any first direction along which tension is applied, as well as along a second direction that is orthogonal to the first direction. Moreover, it should be understood that the directions of expansion, namely the first direction and the second direction, may generally be tangential to a surface of the auxetic structure. In particular, the auxetic structures discussed here may generally not expand substantially in a vertical direction that is associated with a thickness of the auxetic structure.

Figure 4:
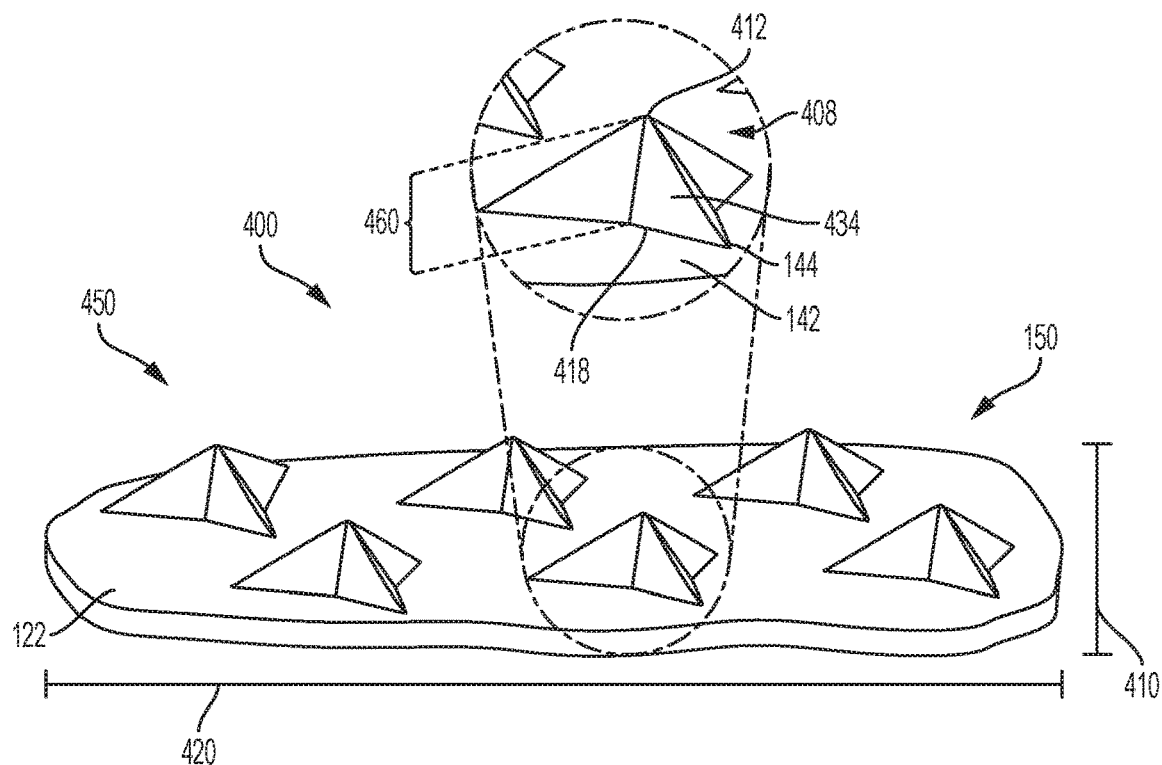
FIG. 4 is a schematic illustration of an embodiment of a portion of an auxetic material in an initial state.
Figure 5:
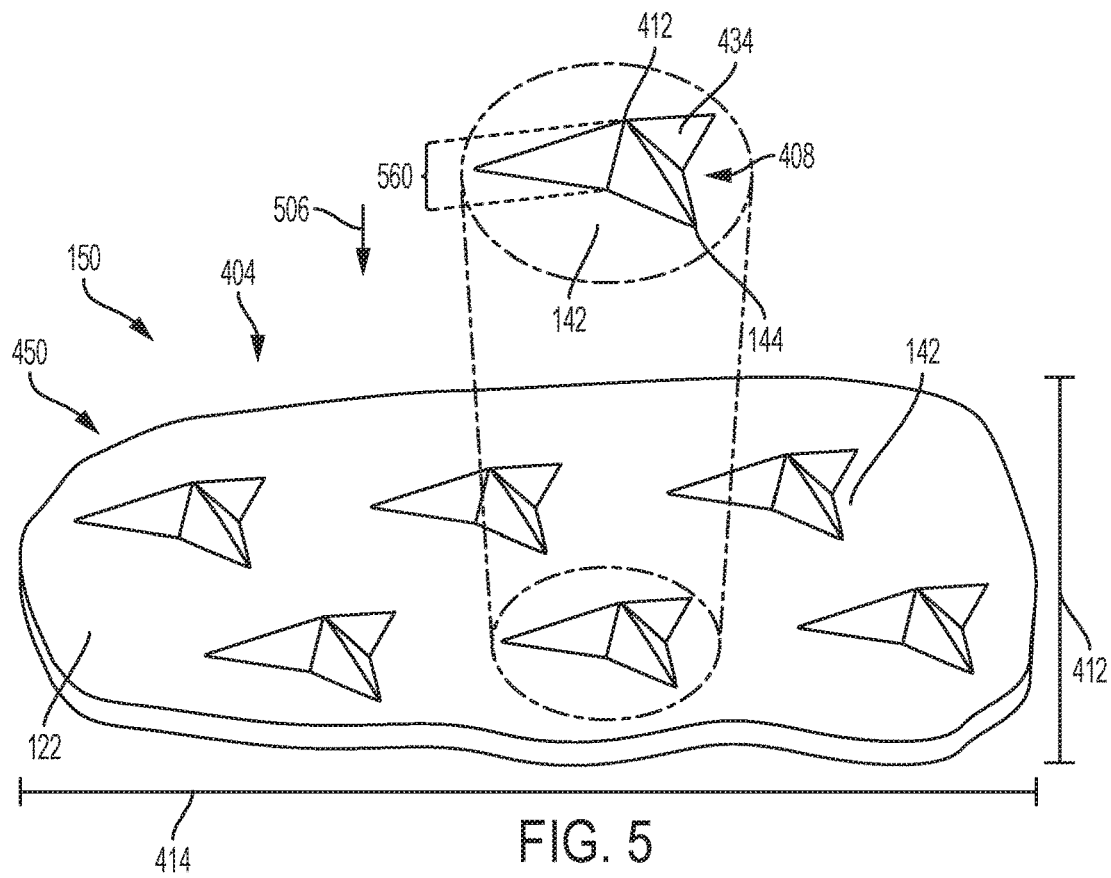
FIG. 5 is a schematic illustration of an embodiment of a portion of an auxetic material when tension is applied in a given direction.

As noted above, structures that expand in a direction orthogonal to the direction under tension, as well as in the direction under tension, are known as auxetic structures. FIGS. 4 and 5 show schematically how the geometries of projections 150 and their surrounding second sole elements 142 may result in a second type of auxetic behavior ("second behavior") of a portion of a second auxetic material 450 that forms second layer 120 (see FIG. 1). FIGS. 4 and 5 illustrate the bi-directional expansion of a portion of second auxetic material 450 when it is under tension in one direction. FIG. 4 shows portion of second auxetic material 450 that has an initial width 410 and an initial length 420 in an initial (unstressed) state 400.

In its unstressed state, the portion of second auxetic material 450 has projections 150 surrounded by second sole elements 142. Each pair of second sole elements 142 are joined at their vertices 144, leaving a plurality of faces ("faces") 434. In the embodiment shown in FIG. 4, projections 150 are triangular star-shaped protrusions, second sole elements 142 are triangular features, and faces 434 represent the sides of triangular star-shaped projections 150.

FIGS. 4 and 5 further provide a comparison of a portion of an embodiment of second auxetic material 450 in its unstressed, initial state 400 (shown in FIG. 4) to a portion of the same embodiment of second auxetic material 450 when it is under tension in a lengthwise direction (as shown in FIG. 5), as stressed state or resultant state 404. In FIG. 5, the application of tension in the direction shown by the arrows to second auxetic material 450 rotates adjacent second sole elements 142, which expands the dimensions of second auxetic material 450. Because the increase in size occurs in all directions (due to the geometry of the original geometric pattern of the projections), this results in an expansion of the auxetic material along both the direction under tension, and along the direction orthogonal to the direction under tension. For example, in the embodiment shown in FIG. 4, in initial state 400, second auxetic material 450 has initial length 420 along one direction (e.g., the longitudinal direction) and an initial width 410 along a second direction that is orthogonal to the first direction (e.g., the lateral direction). In stressed state or resultant state 404 (seen in FIG. 5), second auxetic material 450 has an increased resultant length 414 in the direction under tension and an increased resultant width 412 in the direction that is orthogonal to the direction under tension. It can be understood that in some embodiments, the expansion of second auxetic material 450 is not limited to expansion in the direction under tension.

Thus, in some embodiments, sole structure 104 of FIG. 1 can have an auxetic layer that exhibits a second auxetic behavior that can function as an outsole. In one embodiment, an auxetic layer can comprise the outsole in the sole structure that provides traction and ground contact when the article of footwear strikes the ground. The second auxetic behavior may be different from the first auxetic behavior (see FIGS. 2 and 3) in some embodiments. In some other embodiments, the first auxetic behavior can be substantially similar to the second auxetic behavior.

In different embodiments, exposure to various forces may also produce a change in the shape or geometry, size, and/or height of one or more projections 150 in second layer 120 (see FIG. 1). For example, in FIG. 4, a first projection 408 has an apex 412 at a first height 460. In some embodiments, the height of apex 412 relative to a base 418 of first projection 408 lies generally in the vertical plane of second auxetic material 450 and extends upward from second proximal side 122 of second auxetic material 450.

Referring to FIG. 5, in some embodiments, when a force 506 is applied to first projection 408, the height of first projection 408 may change. In FIG. 5, the height of apex 412 of first projection 408 is decreased to a second height 560. In the embodiments of FIGS. 4 and 5, second height 560 is less than first height 460.

In other embodiments, second height 560 may be substantially similar to or greater than first height 460 as various forces are applied to the sole structure. Depending on the magnitude and the direction of the force(s) applied, changes in area or shape may vary. In some embodiments, a different force may permit an expansion of the projection(s). In some cases, this expansion occurs in the horizontal direction. For example, in one embodiment, the second layer may be exposed to a compressive force in a direction aligned with the horizontal plane, resulting in a second height 560 that is greater than first height 460.

Thus, in different embodiments, second auxetic material 450 may experience different types of forces. During wear, foot and ground forces may compress the second layer along a generally vertical direction. In some embodiments, the second layer may be expanded or experience a force so that there is a splaying outward of the geometry of projections 150. This may occur during vertical compression, e.g., as a wearer exerts his or her weight on the article. Horizontal tensioning or pulling forces may also contribute to the expansion of ground-engaging members. For example, when a projection experiences horizontal tension due to friction with a ground surface, the projection may expand both in the direction of the tension, as well as in a direction perpendicular to the tension. Thus, the auxetic properties of second auxetic material 450 may allow various levels of expansion to the second layer that increase its size in the horizontal plane.

In the embodiments shown in the figures, an auxetic structure, including an outsole that includes an auxetic layer, may be tensioned in the longitudinal direction or in the lateral direction. However, the configuration discussed in this application for auxetic structures comprised of geometric projections surrounded by geometric portions provides a structure that can expand along any first direction along which tension is applied, as well as along a second direction that is orthogonal to the first direction. Moreover, it should be understood that the directions of expansion, namely the first direction and the second direction, may generally be tangential to a surface of the auxetic structure. In particular, the auxetic structures discussed here may generally not expand substantially in a vertical direction that is associated with a thickness of the auxetic structure.

Additional information regarding the various behaviors of auxetic structures is available in U.S. Patent Publication Number 2016/0157553, titled "Footwear With Flexible Auxetic Ground Engaging Members," U.S. Patent Publication Number 2016/0157558, U.S. Patent Publication Number 2016/0157557, U.S. Patent Publication Number 2015/0245683, and U.S. Patent Publication Number 2015/0075033, the entirety of each application being herein incorporated by reference.

Figure 6:
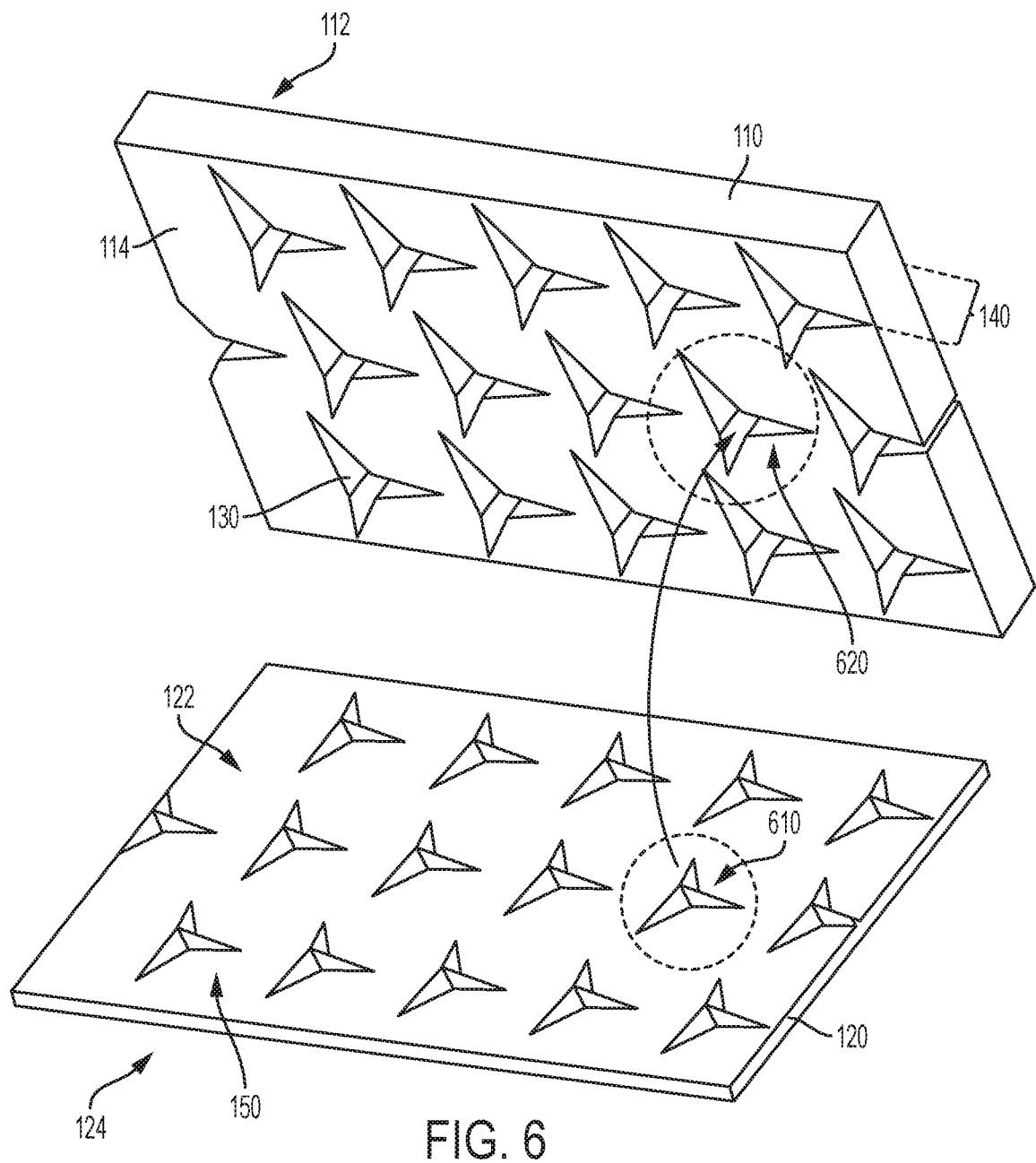
FIG. 6 is a schematic diagram of an embodiment showing how apertures of a first layer receive projections of a second layer.
Figure 7:
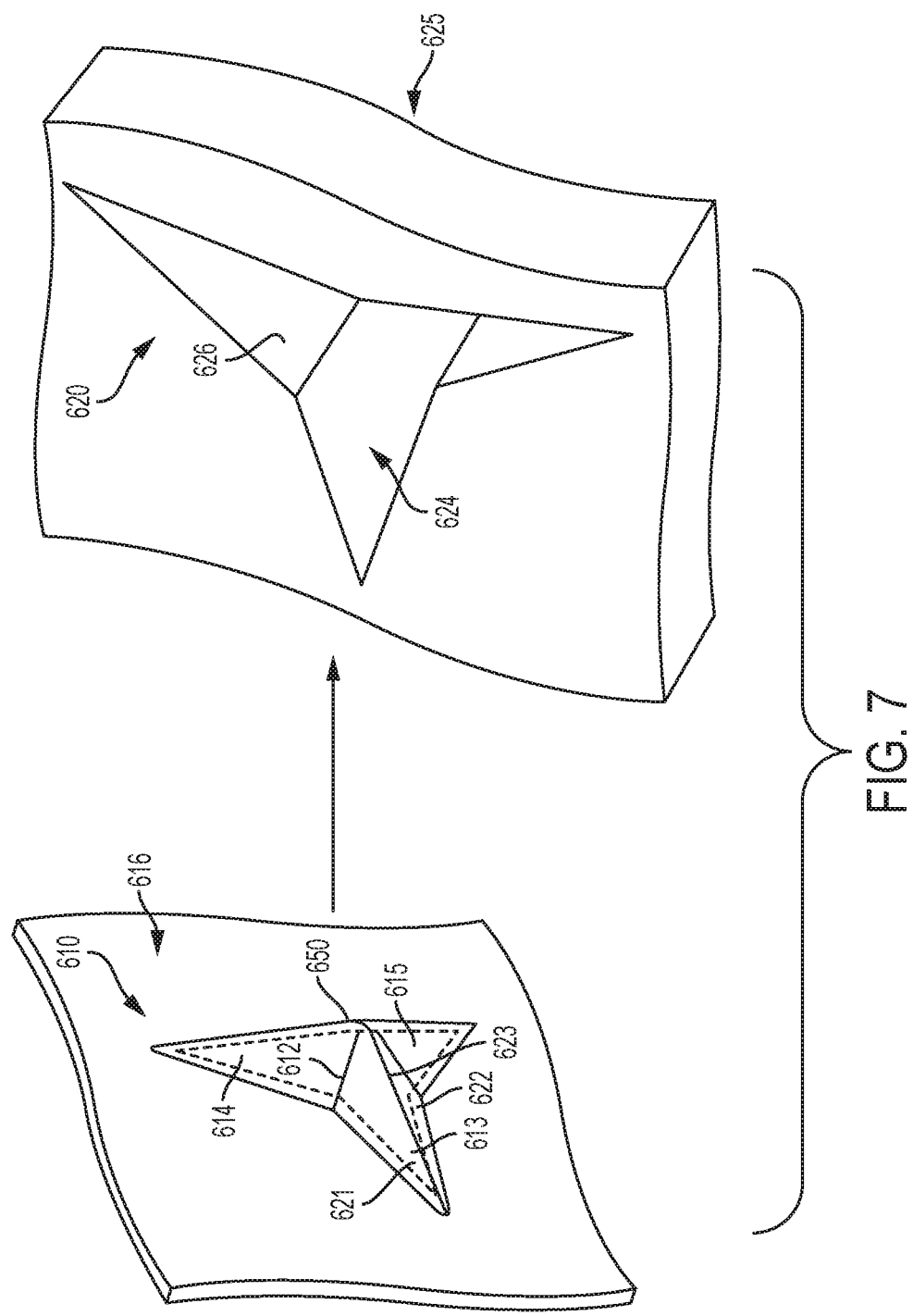
FIG. 7 is a schematic diagram of an embodiment showing an aperture receiving a projection.
Figure 8:
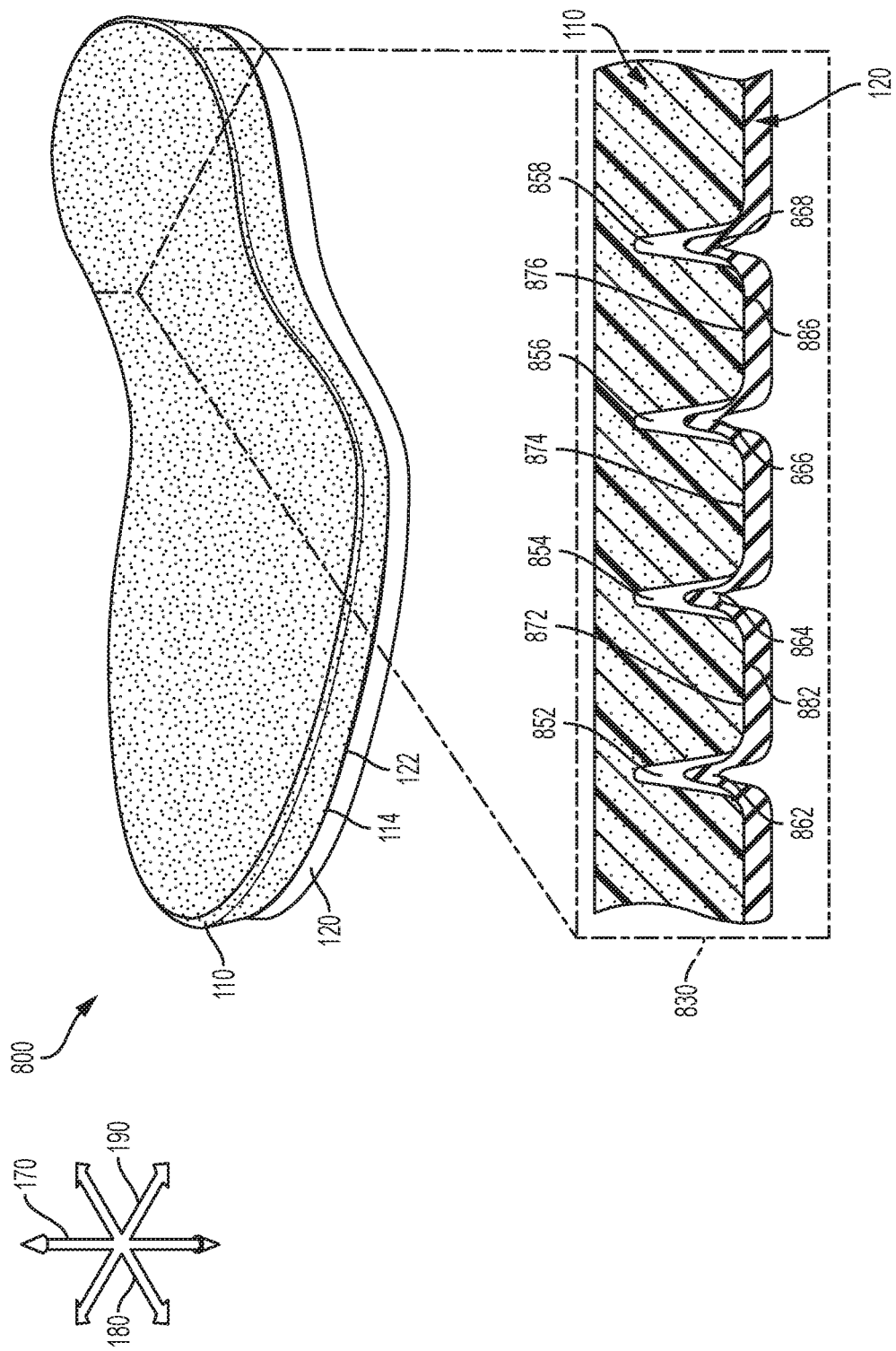
FIG. 8 is an isometric view of an embodiment of a sole structure including an enlarged schematic cross-sectional view of a portion of the sole structure.

As noted above, in some embodiments, an aperture may receive a substantial majority of a projection within the aperture. In some embodiments, each projection of the plurality of projections of the second layer can be configured to extend upward and into a corresponding aperture of the plurality of apertures when the bottom or distal surface of the first layer is disposed adjacent to the top or proximal surface of the second layer. FIG. 6 is a schematic diagram depicting how a second projection 610 of a portion of second layer 120 can enter and be received by a corresponding second aperture 620 in a portion of first layer 110. As shown in the magnified view of FIG. 7, second projection 610 has a substantially three-pointed star cross-sectional shape in a substantially horizontal plane over the entire height of second projection 610. Second projection 610 can also be characterized as having three pyramidal sections (first section 613, second section 614, and third section 615, as shown in FIG. 7) that are joined along edges (e.g., an edge 612 between first section 613 and second section 614, shown in FIG. 7). The top peak of all three pyramidal sections forms apex 650 of second projection 610. As seen in FIG. 7, each pyramidal section, or "arm," of second projection 610 is further comprised of two "faces." For example, first section 613 is seen to have a first face 621 and a second face 622, which are joined along an upper edge 623.

Returning to the larger view shown in FIG. 6, in some embodiments, each projection of second layer 120 may be associated with a corresponding aperture in first layer 110. Specifically, as depicted in FIG. 7, first layer 110 includes second aperture 620 for receiving second projection 610. For purposes of reference, each projection of projections 150 has an outer surface that corresponds to the exterior (e.g., the outward facing sides or faces) of each projection. Furthermore, each aperture of apertures 130 has an inner surface that corresponds to the interior of each aperture (i.e., the surface extending through first thickness 140, shown in FIG. 6). For purposes of this disclosure, the use of the terms "fit," "coupling," or "mate" should be understood to refer to the concept of a projection entering into an aperture. The relationship between the two portions need not be snug, close, or secure in order for a projection to be described as fitting within or mating with a corresponding aperture. Thus, in one embodiment, a projection fits into an aperture when the outer surface of the projection remains substantially or completely spaced apart from the inner surface of the corresponding aperture once the projection is inserted and received by the aperture. In other words, the outer surface of the projection need not physically contact any region of the inner surface of the aperture in order for the two portions to be fitted or coupled together. This coupling will be discussed further with respect to FIG. 8.

In different embodiments, each projection of projections 150 may be sized and shaped to fit into a corresponding aperture in different embodiments. For example, referring to FIG. 7, second projection 610 has an outer surface 616 that bounds or defines a first volume. In addition, second aperture 620 is bounded by an inner surface 626 within first thickness 140 of second layer 120 (see FIG. 6) that bounds or defines a second volume extending between a distal end 624 to a proximal end 625 (shown in dotted lines in FIG. 7). The first volume is seen to be greater than the second volume. In one embodiment, the first volume is substantially greater than the second volume such that outer surface 616 of second projection 610 remains spaced apart from inner surface 626 of second aperture 620, at least when the sole structure is in the unstressed or initial state. Thus, in some embodiments, second aperture 620 and second projection 610 can be configured to expand and/or contract independently when tension is applied to the sole structure. In other words, referring to FIG. 6, the first auxetic behavior of first layer 110 can be configured to occur independently of the second auxetic behavior of second layer 120 in some embodiments. Thus, in one embodiment, first layer 110 is joined to second layer 120, but its auxetic performance does not necessarily complement, mimic, or interact with the auxetic performance of second layer 120.

In addition, outer surface 616 of second projection 610 can have a geometry substantially similar to (or matching with) contours of inner surface 626 of second aperture 620, such that the two portions are generally aligned or correspond to one another, as shown in FIG. 7. However, in other embodiments, the geometry of second projection 610 can differ from the geometry of second aperture 620, such that the two layers are associated with substantially different auxetic behaviors. In some cases, this difference in shape may prevent a projection from being received by an aperture, though in other embodiments, a projection may remain small enough to be received by a corresponding aperture. In addition, in some embodiments, the first auxetic behavior of first layer 110 can be configured to occur independently of the second auxetic behavior of second layer 120 by altering the shapes of the apertures relative to the projections.

Furthermore, in other embodiments, the orientation associated with each of the patterns of the auxetic structures may vary such that the two layers are associated with substantially different auxetic behaviors. For example, first layer 110 may include a first pattern of apertures 130, and second layer 120 may include a second pattern of projections 150. In some embodiments, the first pattern of apertures 130 can be arranged along a first orientation, and the second pattern of projections 150 can be arranged along a second orientation that is different from the first orientation. In some cases, this lack of alignment may prevent a projection from being received by an aperture, though in other embodiments, a projection may remain small enough or closely aligned enough to be received by a corresponding aperture. In some embodiments, the first auxetic behavior of first layer 110 can be configured to occur independently of the second auxetic behavior of second layer 120 through the variation of orientation of either or both of the apertures or projections.

As noted above, in different embodiments, the dimensions of each of apertures 130 and each of projections 150 can vary. In some embodiments, apertures 130 may be blind-hole apertures, where only one end (i.e., the distal end) of each of the apertures is open or exposed, while the opposite end (i.e., the proximal end) of each of the apertures remains enclosed within the thickness of the layer. In other words, in such case, only one end of an aperture may be exposed along an exterior surface of the layer. In other embodiments, apertures 130 may be through-hole apertures, where one end of an aperture is open or exposed along a first exterior surface of the layer, and the opposite end of the same aperture is also open or exposed along an opposite, exterior surface of the layer (see FIG. 12). In other words, a through-hole aperture extends through the entire thickness of the layer. In addition, in some other embodiments, a layer may utilize a combination of through-hole apertures and blind-hole apertures. Through-hole apertures may have varying or irregular widths as they extend through the thickness of the sole layer (see FIG. 11), or the widths may be substantially uniform throughout the thickness of the sole layer (see FIG. 12).

In some embodiments, when coupling occurs between the two layers, a first side of one layer could be flush with a second side of the other layer. In one embodiment shown in FIG. 8, portions of first distal side 114 of first layer 110 may be disposed flush with or against portions of second proximal side 122 of second layer 120, such that portions of each side physically contact each other. In some embodiments, a substantial entirety of first distal side 114 of first layer 110 may be flush against portions of second proximal side 122 of second layer 120. An example is depicted in a cross-sectional view 830 of a first sole structure 800, where a portion of first layer 110 is shown disposed above and directly adjacent to a portion of second layer 120. In addition, it can be seen that a first aperture 852 has received a first projection 862, a second aperture 854 has received a second projection 864, a third aperture 856 has received a third projection 866, and a fourth aperture 858 has received a fourth projection 868. Furthermore, a first upper surface 872 of first layer 110 can contact a first lower surface 882 of second layer 120, a second upper surface 874 of first layer 110 can contact a second lower surface 884 of second layer 120, and a third upper surface 876 of first layer 110 can contact a third lower surface 886 of second layer 120. Nevertheless, it should be understood that a flush configuration does not require uninterrupted or continuous physical contact between first distal side 114 of first layer 110 and second proximal side 122 of second layer 120. In some embodiments, a "flush configuration" may be achieved by the substantially full or entire insertion of projections 150 into corresponding apertures 130, as depicted in cross-sectional view 830, without the two surfaces of first distal side 114 and second proximal side 122 being entirely pressed against one another. Moreover, the height of each projection is always less than the corresponding aperture in embodiments where first layer 110 and second layer 120 are flush with one another for purposes of this disclosure, allowing a smooth interconnection between first layer 110 and second layer 120.

Figure 9:
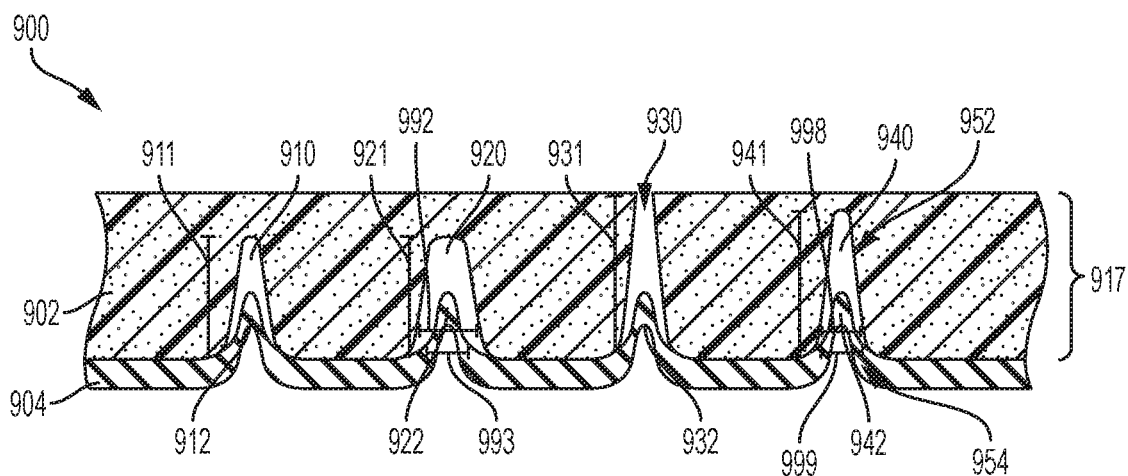
FIG. 9 is a schematic cross-sectional view of a portion of a sole structure.

In FIG. 9, a cross-sectional view of an embodiment of a portion of a second sole structure 900 is illustrated. A first layer 902 with apertures and a second layer 904 with projections are disposed adjacent to and substantially flush against one another. Second sole structure 900 includes a fifth aperture 910 that receives a fifth projection 912, a sixth aperture 920 that receives a sixth projection 922, a seventh aperture 930 that receives a seventh projection 932, and an eighth aperture 940 that receives an eighth projection 942. As noted above, each of the dimensions of apertures 130 can vary in some embodiments. For example, the apertures may have varying respective depths, where each depth may be understood to extend from a proximal end 952 to a distal end 954 of the aperture. In the embodiment of FIG. 9, fifth aperture 910 has a first depth 911, sixth aperture 920 has a second depth 921, seventh aperture 930 has a third depth 931, and eighth aperture 940 has a fourth depth 941. While first depth 911 and second depth 921 are substantially similar, fourth depth 941 is greater than either first depth 911 or second depth 921. Furthermore, third depth 931 is greater than each of first depth 911, second depth 921, and fourth depth 941. In addition, it can be seen that while fifth aperture 910, sixth aperture 920, and eighth aperture 940 are each blind-hole apertures, seventh aperture 930 is a through-hole aperture, and extends through a thickness 917 of first layer 110. In each case, the depths of the four apertures are substantially greater than the heights of the corresponding projections inserted within the cavities or tunnels of the apertures.

Furthermore, in FIG. 9, it can be seen that other dimensions of second sole structure 900 may vary in some embodiments. For example, sixth aperture 920 has a first width 992 and sixth projection 922 has a second width 993 that is smaller than first width 992. Similarly, eighth aperture 940 has a third width 998 and eighth projection 942 has a fourth width 999 that is smaller than first width 992. In some embodiments, the width of one aperture may be substantially larger than the width of another aperture. As shown in FIG. 9, first width 992 of sixth aperture 920 is larger than third width 998 of eighth aperture 940. However, second width 993 of sixth projection 922 is substantially similar to fourth width 999 of eighth projection 942 in FIG. 9.

Figure 10:
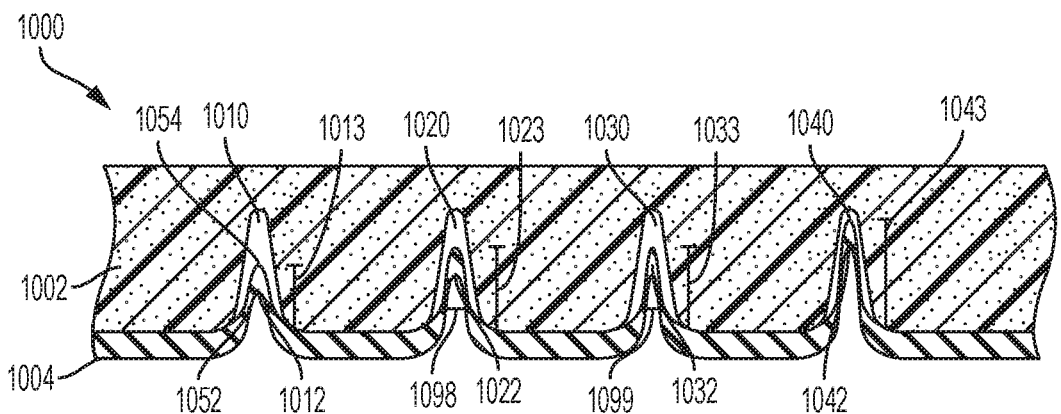
FIG. 10 is a schematic cross-sectional view of a portion of a sole structure.

In FIG. 10, a cross-sectional view of an embodiment of a portion of a third sole structure 1000 is illustrated. A first layer 1002 with apertures and a second layer 1004 with projections are disposed adjacent to and substantially flush against one another. Third sole structure 1000 includes a ninth aperture 1010 that receives a ninth projection 1012, a tenth aperture 1020 that receives a tenth projection 1022, an eleventh aperture 1030 that receives an eleventh projection 1032, and a twelfth aperture 1040 that receives a twelfth projection 1042. As noted above, each of the dimensions of projections can vary in some embodiments. For example, the projections may have varying respective heights, where each height may be understood to extend from a base 1052 to an apex 1054 of the projection. In the embodiment of FIG. 10, ninth projection 1012 has a first height 1013, tenth projection 1022 has a second height 1023, eleventh projection 1032 has a third height 1033, and twelfth projection 1042 has a fourth height 1043. While second height 1023 and third height 1033 are substantially similar, first height 1013 can be seen to be greater than either second height 1023 or third height 1033. Furthermore, fourth height 1043 is greater than each of first height 1013, second height 1023, and third height 1033. In addition, in each case, the depths of the four apertures are substantially greater than the heights of the corresponding projections 150 inserted within the cavities or tunnels of the apertures.

Furthermore, in FIG. 10, it can be seen that other dimensions of third sole structure 1000 may vary in some embodiments. For example, tenth projection 1022 has a fifth width 1098, and eleventh projection 1032 has a sixth width 1099 that is larger than fifth width 1098. Thus, in some embodiments, the widths of projections may be similar to one another (as shown in FIG. 9), or they may differ.

Figure 11:
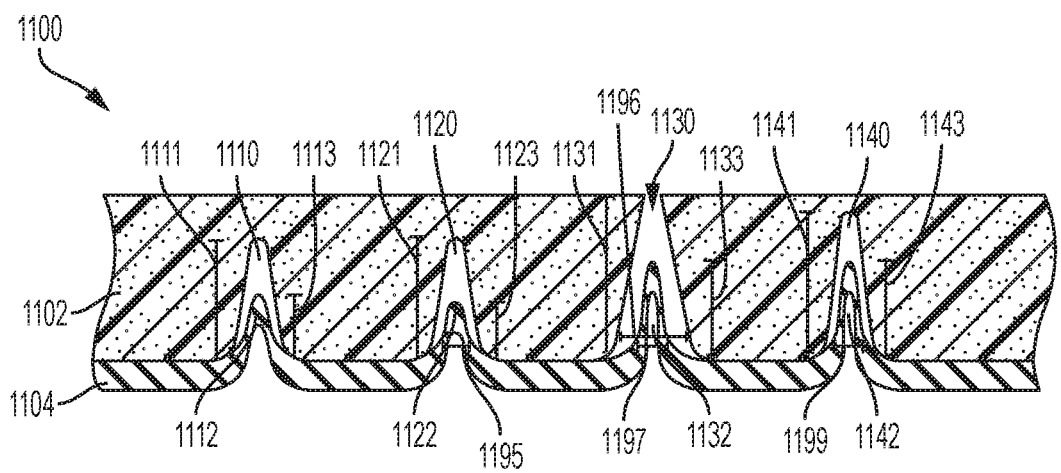
FIG. 11 is a schematic cross-sectional view of a portion of a sole structure.

Referring now to FIG. 11, a cross-sectional view of an embodiment of a portion of a fourth sole structure 1100 is illustrated. A first layer 1102 with apertures 130 and a second layer 1104 with projections 150 are disposed adjacent to and substantially flush against one another. Fourth sole structure 1100 includes a thirteenth aperture 1110 that receives a thirteenth projection 1112, a fourteenth aperture 1120 that receives a fourteenth projection 1122, a fifteenth aperture 1130 that receives a fifteenth projection 1132, and a sixteenth aperture 1140 that receives a sixteenth projection 1142. As noted above, each of the dimensions of apertures 130 can vary in some embodiments. Furthermore, in some embodiments, each of the dimensions of projections can also vary as well. For example, the apertures may have varying respective depths, and the projections may also have varying heights, in fourth sole structure 1100. In the embodiment of FIG. 11, thirteenth aperture 1110 has a fifth depth 1111, fourteenth aperture 1120 has a sixth depth 1121, fifteenth aperture 1130 has a seventh depth 1131, and sixteenth aperture 1140 has an eighth depth 1141. While fifth depth 1111 and sixth depth 1121 are substantially similar, eighth depth 1141 is greater than either fifth depth 1111 or sixth depth 1121. Furthermore, seventh depth 1131 is greater than each of fifth depth 1111, sixth depth 1121, and eighth depth 1141. In addition, it can be seen that while thirteenth aperture 1110, fourteenth aperture 1120, and sixteenth aperture 1140 are each blind-hole apertures, fifteenth aperture 1130 is a through-hole aperture. In each case, the depths of the four apertures are substantially greater than the heights of the corresponding projections 150 inserted within the cavities or tunnels of the apertures. It can also be seen that thirteenth projection 1112 has a fifth height 1113, fourteenth projection 1122 has a sixth height 1123, fifteenth projection 1132 has a seventh height 1133, and sixteenth projection 1142 has an eighth height 1143. While fifth height 1113 and sixth height 1123 are substantially similar, and seventh height 1133 and eighth height 1143 are substantially similar, it can be seen that both seventh height 1133 and eighth height 1143 are greater than either fifth height 1113 or sixth height 1123.

Furthermore, in FIG. 11, it can be seen that other dimensions of fourth sole structure 1100 may vary in some embodiments. For example, fifteenth aperture 1130 has a seventh width 1196 and fifteenth projection 1132 has an eighth width 1197 that is smaller than seventh width 1196. In addition, seventh width 1196 of fifteenth aperture 1130 is substantially larger than any of the widths associated with thirteenth aperture 1110, fourteenth aperture 1120, and sixteenth aperture 1140. Similarly, in FIG. 11, the projections can include varying widths. For example, fourteenth projection 1122 has a ninth width 1195 and sixteenth projection 1142 has a tenth width 1199. As shown in FIG. 11, ninth width 1195 and tenth width 1199 are substantially similar. However, eighth width 1197 is greater than either of ninth width 1195 and tenth width 1199.

It can also be seen that the outer surface of each of the projections depicted in FIGS. 8-11 remains substantially or completely spaced apart from the inner surface of the corresponding aperture that the projection extends into. In other words, the outer surface of the projections need not physically contact any region of the inner surface of their corresponding apertures, though the layers are connected in a flushed configuration.

Figure 12:
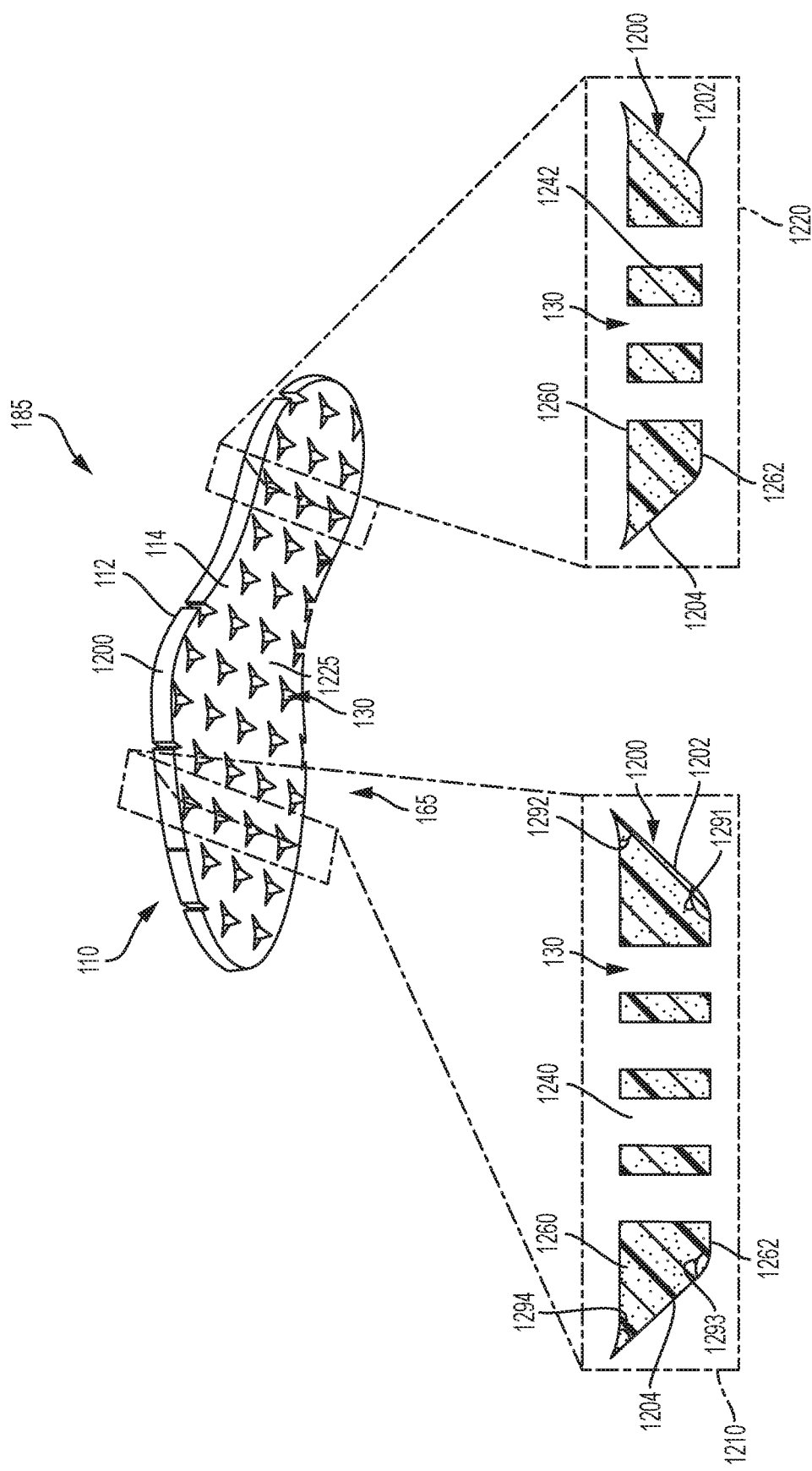
FIG. 12 is a bottom isometric view of an embodiment of a sole layer including two enlarged schematic cross-sectional views of two portions of the sole structure.

In different embodiments, an article of footwear can include provisions for allowing two layers of the sole structure to be joined together and/or disposed adjacent to one another. For example, a lower layer may include a cavity or recess that is configured to receive an upper layer. In addition, an upper layer may include an overall shape configured to be received by the lower layer. FIG. 12 is a schematic isometric view of first layer 110 including two enlarged cross-sectional views. In the embodiment of FIG. 12, first layer 110 of article 100 includes a plurality of through-hole apertures 130. In other words, as discussed earlier, each of the apertures formed in first layer 110 extend the entire thickness of first layer 110. Thus, apertures 130 include openings formed along a downwardly-facing lower surface 1225 of first layer 110 as well as corresponding openings or depressions that are formed along the opposing, upwardly-facing surface of first layer 110 (see FIG. 13).

Furthermore, in FIG. 12, first layer 110 has a layer sidewall 1200 that corresponds to its outer surface extending from first proximal side 112 to first distal side 114. In some embodiments, first layer 110 may have one or more tapered portions, including sidewalls, portions, and/or surfaces. As shown in both a first cross-sectional view 1210 and a second cross-sectional view 1220, layer sidewall 1200 comprises a first lateral sidewall 1202 and a first medial sidewall 1204. In some embodiments, portions of first lateral sidewall 1202 may have a tapered geometry. Also, in some embodiments, portions of first medial sidewall 1204 may have a tapered geometry. In the embodiment of FIG. 12, both first lateral sidewall 1202 and first medial sidewall 1204 have tapered geometries.

The term "tapered" as used herein refers to the angled or sloped configuration of each sidewall. In some embodiments, each sidewall may be tapered in an approximately linear manner. Specifically, each sidewall may be an approximately straight surface that forms non-right angles with respect to a top portion and/or a bottom portion of the insert. In other embodiments, each sidewall could be tapered in a non-linear manner. Specifically, each sidewall could be contoured in a convex and/or concave manner, or could be comprised of a combination of convex and/or concave contours. The degree or manner in which the sidewalls can be tapered may be configured to match or align with a corresponding cavity, for example, in a lower layer or in an upper for an article of footwear.

Additional information regarding the use of a tapered structure can be found in U.S. Patent Publication Number 2015/0289590, published Oct. 15, 2015, (previously U.S. Patent Application Ser. No. 14/248,431, filed Apr. 9, 2014), titled "Footwear System With Removable Inserts,".

As shown in both a first cross-sectional view 1210 and a second cross-sectional view 1220, first lateral sidewall 1202 and first medial sidewall 1204 may be angled with respect to a top portion 1260 and a bottom portion 1262 of first layer 120. In this exemplary configuration, first lateral sidewall 1202 forms a first angle 1291 with bottom portion 1262 and first lateral sidewall 1202 forms a second angle 1292 with top portion 1260. Likewise, first medial sidewall 1204 forms a third angle 1293 with bottom portion 1262 and first medial sidewall 1204 forms a fourth angle 1294 with top portion 1260.

In different embodiments, the value of first angle 1291, second angle 1292, third angle 1293, and fourth angle 1294 can vary. In some embodiments, first angle 1291 and third angle 1293 may both have values approximately in the range between 90 degrees and 150 degrees. In other words, in some embodiments, first angle 1291 and third angle 1293 may be obtuse angles. In some embodiments, second angle 1292 and fourth angle 1294 may both have values approximately in the range between 20 degrees and 90 degrees. In other words, in some embodiments, second angle 1292 and fourth angle 1294 may be acute angles.

In some embodiments, first angle 1291 and second angle 1292 could be approximately similar, however, in other embodiments first angle 1291 and second angle 1292 could have different values. Likewise, in some embodiments, second angle 1292 and fourth angle 1294 could be approximately similar; however, in other embodiments, second angle 1292 and fourth angle 1294 could have different values. In at least some embodiments, for example, the degree of tapering, slope, or slanting, of first lateral sidewall 1202 could be different from the degree of tapering, slope, or slanting of first medial sidewall 1204. In such embodiments, the differences in tapering, slope, or slanting results in different values of first angle 1291 and third angle 1293, as well as different values of second angle 1292 and fourth angle 1294. Differences in tapering between first lateral sidewall 1202 and first medial sidewall 1204 could provide variations in support when leaning toward one side (e.g., a lateral side) or toward another side (e.g., a medial side).

In some embodiments, the degree of tapering of one or more insert sidewalls could vary over the length of an insert. For example, as indicated in FIG. 12, first layer 110 may have a first cross-sectional area 1240 at forefoot portion 105 and a second cross-sectional area 1242 at heel portion 145. In some embodiments, first cross-sectional area 1240 and second cross-sectional area 1242 could be substantially similar. In other embodiments, first cross-sectional area 1240 and second cross-sectional area 1242 could be substantially different. In the embodiment of FIG. 12, first cross-sectional area 1240 and second cross-sectional area 1242 are substantially different.

Although the illustrated embodiments show top portion 1260 and bottom portion 1262 as approximately flat, in other embodiments, top portion 1260 and/or bottom portion 1262 could have any other geometry. For example, it is contemplated that in some other embodiments, top portion 1260 and/or bottom portion 1262 could be contoured, with both convex and/or concave portions.

In different embodiments, the cross-sectional geometry of first layer 110 could vary. In some embodiments, the cross-sectional geometry could comprise any approximate geometry, including, but not limited to, a rounded geometry, a rectilinear geometry as well as any other kind of geometry. In an exemplary embodiment, first layer 110 may have an approximately trapezoidal cross-sectional geometry resulting from the approximately parallel arrangement of top portion 1260 and bottom portion 1262, and the acute/obtuse orientations of first lateral sidewall 1202 and first medial sidewall 1204. As discussed in further detail below, this approximately trapezoidal cross-sectional geometry may result in a wedge-like configuration for first layer 110 that may correspond to and fit snugly into a cavity formed in a different sole layer.

Figure 13:
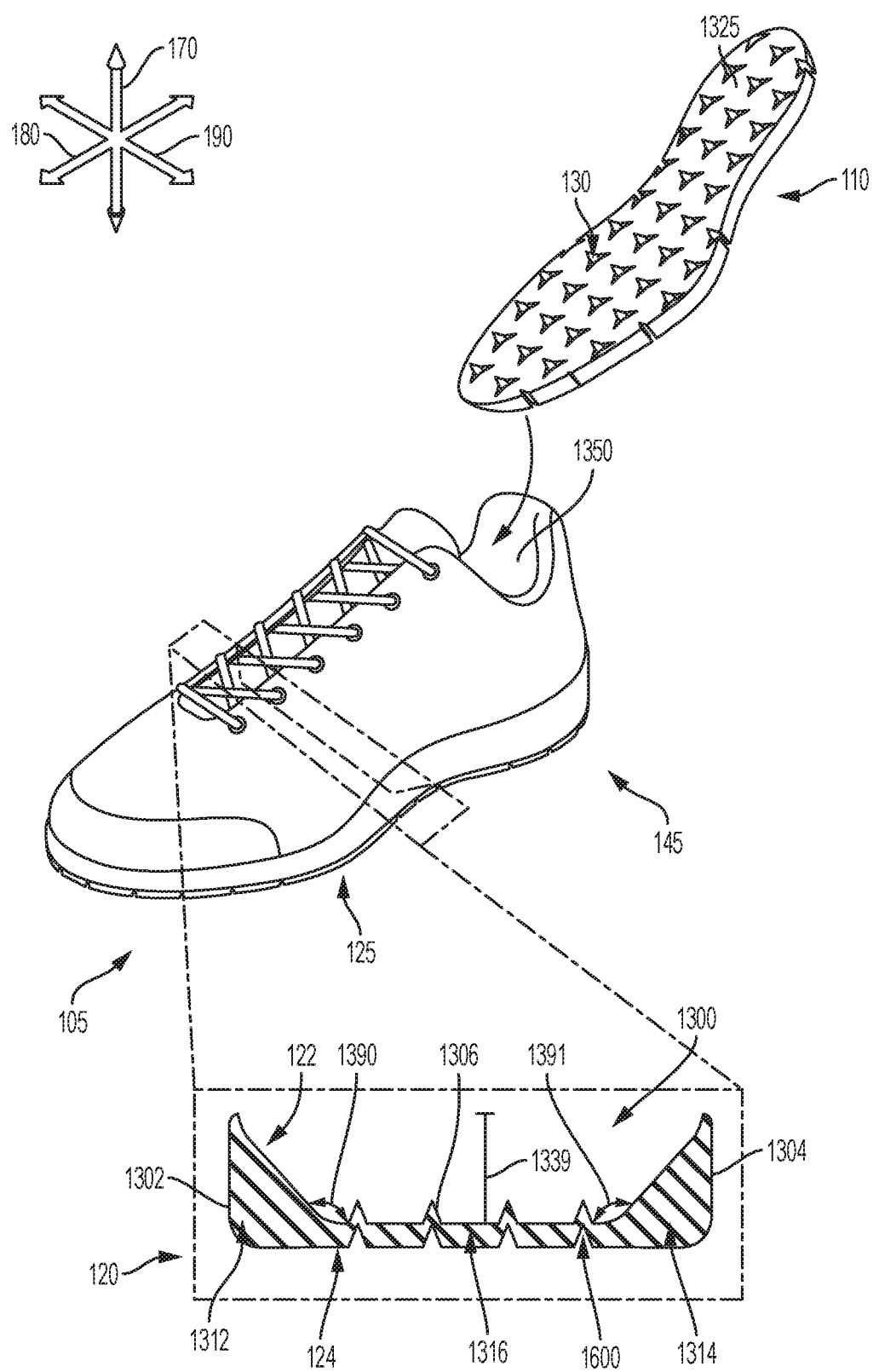
FIG. 13 is a schematic isometric view of an embodiment of an article of footwear and a sole layer being inserted into the article of footwear with an enlarged cross-sectional view.

In some embodiments, as shown in FIG. 13, second layer 120 may include a cavity that is configured to receive one or more layers of a sole structure. For example, in one embodiment, second layer 120 may be configured to receive first layer 110. In FIG. 13, first layer 110 includes through-hole apertures 130, as illustrated by the plurality of holes formed along an upper surface 1325 of first layer 110. Each of the holes correspond to the apertures depicted in FIG. 12 formed on the lower side of first layer 110. FIG. 13 includes an enlarged cross-sectional schematic view of a portion of second layer 120 in midfoot portion 125 that provides an illustration of a portion of a cavity 1300. Generally, cavity 1300 of second layer 120 may be disposed along or formed with second proximal side 122 of second layer 120. In some embodiments, cavity 1300 may extend through forefoot portion 105, midfoot portion 125, and/or heel portion 145 of second layer 120. In one embodiment (as represented in FIG. 13), cavity 1300 extends from forefoot portion 105 through midfoot portion 125 and to heel portion 145 of second layer 120.

Referring to FIG. 13, and in particular to the enlarged cross-sectional view, cavity 1300 may include a first cavity sidewall 1302 that is associated with a first side peripheral portion 1312 of second layer 120. In addition, cavity 1300 may include a second cavity sidewall 1304 that is associated with a second side peripheral portion 1314 of second layer 120. In addition, cavity 1300 may include a lower cavity surface 1306 that is associated with a bottom portion 1316 of second layer 120. In some embodiments, lower cavity surface 1306 is approximately parallel with second distal side 124 of second layer 120. In one embodiment, lower cavity surface 1306 could be approximately parallel with a ground-contacting surface of sole structure 104, such as, for example, an outer surface of an outsole. Furthermore, as will be discussed in greater detail below with respect to FIG. 16, second distal side 124 may include a plurality of depressions 1600 that correspond to each of the projections formed along lower cavity surface 1306.

The geometry of cavity 1300 may vary in different embodiments. As noted above, in some embodiments, the geometry of cavity 1300 may be configured to accommodate a different layer of sole structure 104. In particular, in some embodiments, the geometry of cavity 1300 may be configured to receive the tapered insert sidewalls of first layer 110. Thus, in some embodiments, first cavity sidewall 1302 may have a tapered geometry. Also, in some embodiments, second cavity sidewall 1304 may have a tapered geometry. In the embodiment of FIG. 13, both first cavity sidewall 1302 and second cavity sidewall 1304 have tapered geometries. The degree or manner in which the sidewalls can be tapered may be configured to match or align with a corresponding insert, for example, the tapered sidewalls of first layer 110 shown in FIG. 12.

As seen in the enlarged cross-sectional view of FIG. 13, first cavity sidewall 1302 and second cavity sidewall 1304 may be angled with respect to lower cavity surface 1306 of cavity 1300. In FIG. 13, first cavity sidewall 1302 forms a first angle 1390 with lower cavity surface 1306. Likewise, second cavity sidewall 1304 forms a second angle 1391 with lower cavity surface 1306.

In different embodiments, the value of first angle 1390 and second angle 1391 can vary. In some embodiments, first angle 1390 and second angle 1391 may both have values approximately in the range between 90 degrees and 150 degrees. In other words, in some embodiments, first angle 1390 and second angle 1391 may be obtuse angles. In at least some embodiments, first angle 1390 and second angle 1391 may both be substantially greater than 105 degrees.

In some embodiments, first angle 1390 and second angle 1391 could be approximately similar; however, in other embodiments, first angle 1390 and second angle 1391 could have different values. In at least some embodiments, for example, the degree of tapering, slope, or slanting, of first cavity sidewall 1302 could be different from the degree of tapering, slope, or slanting of second cavity sidewall 1304. In such embodiments, the differences in tapering, slope, or slanting results in different values of first angle 1390 and second angle 1391. Differences in tapering between first cavity sidewall 1302 and second cavity sidewall 1304 could provide variations in support when leaning toward one side (e.g., a lateral side) or toward another side (e.g., a medial side).

In different embodiments where an insertable sole layer has sidewalls that vary in geometry (for example, in slope or length) over the length of the layer, cavity 1300 can include cavity sidewalls that vary in a corresponding manner. In other embodiments, the sidewall angles could vary in any other manner and may generally be selected to accommodate the angles formed by sidewalls of a corresponding insertable sole layer.

In the embodiment depicted in FIG. 13, lower cavity surface 1306 is seen to be generally flat. In particular, the approximate depth of lower cavity surface 1306, indicated schematically as cavity depth 1339, may be approximately constant between first cavity sidewall 1302 and second cavity sidewall 1304 (in a lateral direction). However, in other embodiments, lower cavity surface 1306 could be a contoured surface, including convex and/or concave portions. In such other embodiments, the approximate depth of lower cavity surface 1306 could be variable. Furthermore, cavity depth 1339 may vary in the longitudinal direction of second layer 120.

In different embodiments, the cross-sectional geometry of cavity 1300 could vary. In some embodiments, the cross-sectional geometry could comprise any approximate geometry, including, but not limited to, a rounded geometry, a rectilinear geometry as well as any other kind of geometry. In an exemplary embodiment, cavity 1300 may have an approximately trapezoidal cross-sectional geometry resulting from angled arrangement of first cavity sidewall 1302 with lower cavity surface 1306 and of second cavity sidewall 1304 with lower cavity surface 1306. Moreover, as with first layer 110, cavity 1300 can have a cross-sectional geometry that varies over its length.

Figure 14:
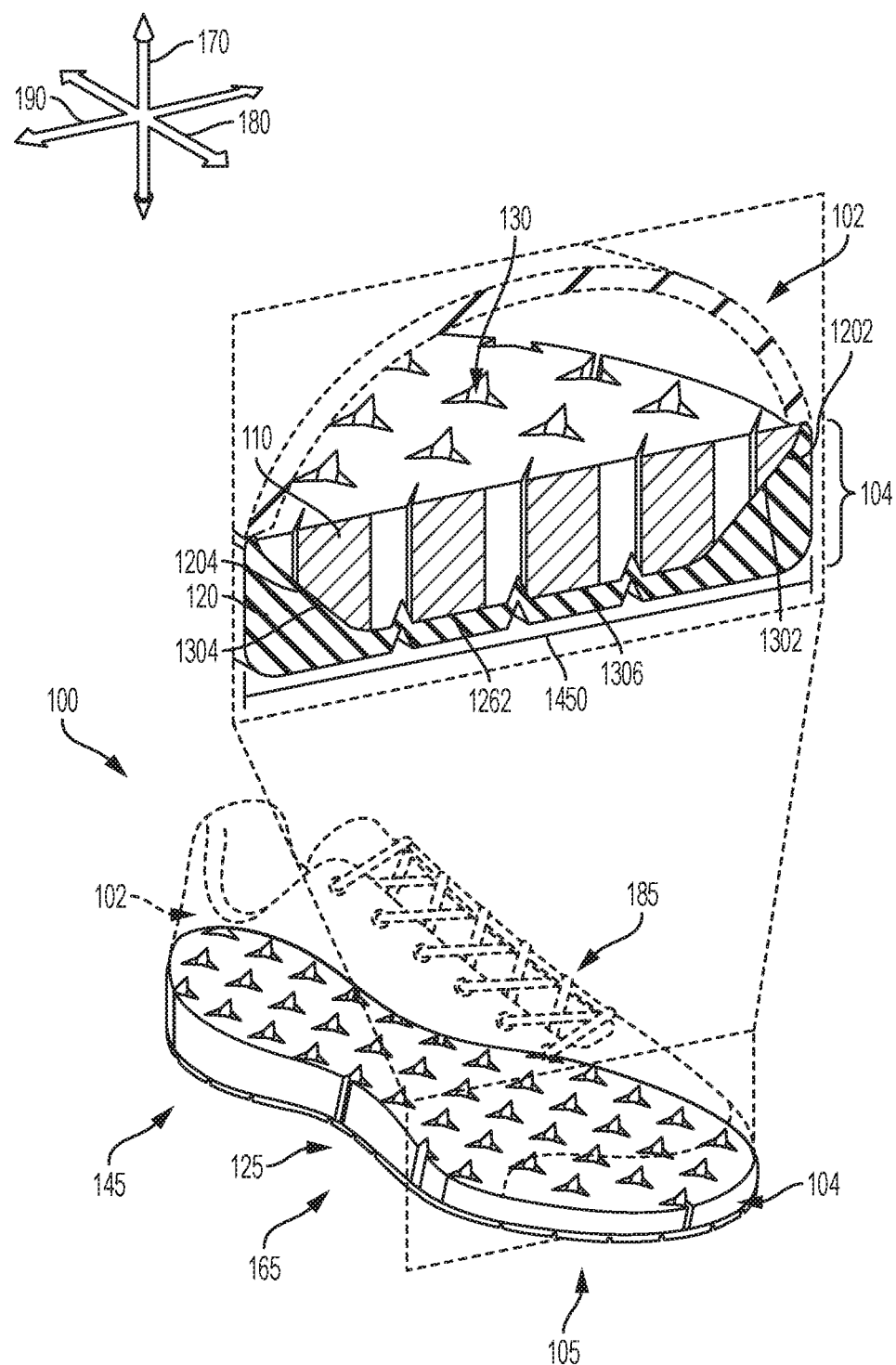
FIG. 14 is a schematic view of an embodiment of a configuration of an article of footwear in a neutral configuration.
Figure 15:
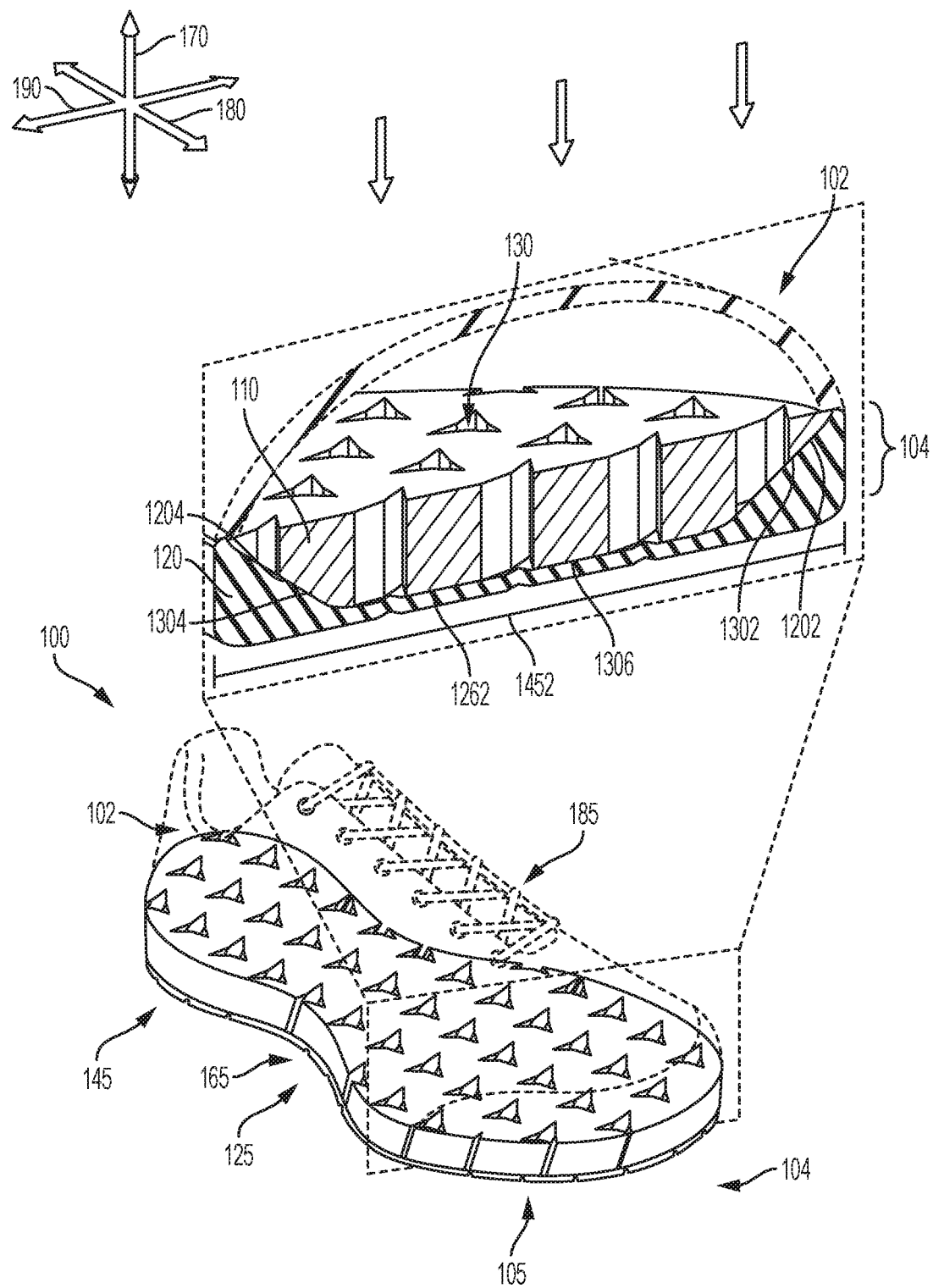
FIG. 15 is a schematic view of an embodiment of a configuration of an article of footwear in an expanded configuration.

First layer 110 may be inserted into article 100 and received by cavity 1300 in some embodiments. In FIG. 13, first layer 110 is being inserted into an opening 1350 of article of footwear 100. FIGS. 14 and 15 illustrate a configuration of article of footwear 100 with first layer 110 disposed within cavity 1300 while article 100 is assembled. Referring to FIG. 14, one or more portions of first layer 110 may be in contact with portions interior to article of footwear 100 upon insertion. In different embodiments, portions of upper 102 may touch or extend into cavity 1300 (see FIG. 13) and may, therefore, contact lateral sidewall 1202, medial sidewall 1204 and/or bottom portion 1262 of first layer 110. In addition, as shown in FIGS. 12 and 14, bottom portion 1262 of first layer 110 can be in contact with lower cavity surface 1306 of cavity 1300.

Additionally, in some other embodiments, a lower portion of upper 102 may be disposed between bottom portion 1262 of first layer 110 and lower cavity surface 1306 of the cavity. In other embodiments, however, portions of upper 102 may not extend into the cavity, and/or may only partially extend into the cavity. As shown in FIGS. 14 and 15, in some embodiments, first lateral sidewall 1202 could be in direct contact with first cavity sidewall 1302. Also, in some embodiments, first medial sidewall 1204 could be in contact with second cavity sidewall 1304.

Thus, in some embodiments, the tapered configuration of cavity 1300 (see FIG. 13) and layer sidewall 1200 (see FIG. 12) can provide a means of securing first layer 110 within second layer 120 and help form sole structure 104. This mechanism can improve the ability of each of the two layers to exhibit independent auxetic responses or behaviors. In some embodiments, some adhesives or other attachment mechanisms may be utilized. However, the use of a tapered securement system allows first layer 110 to move and potentially slide to a small extent relative to second layer 120. In one embodiment, as first layer 110 is compressed and exhibits a first auxetic behavior, sole elements around apertures can move in toward the centers of the apertures and "close" or decrease the size of the openings of the apertures, while second layer 120 can remain substantially unaffected by the first auxetic behavior. In other words, the first auxetic behavior does not necessarily shape or affect the auxetic response of second layer 120. In another embodiment, a portion of first layer 110 can experience tension and exhibit a different auxetic behavior, such that sole elements around the apertures in that region rotate, thus opening up apertures as discussed above with reference to FIG. 2, while second layer 120 can remain substantially unaffected by the first auxetic behavior. Similarly, in some embodiments, as second layer 120 is compressed, the compressed region can expand, such that projections "splay" outward in a second auxetic behavior, which can occur substantially independently of a first auxetic behavior of first layer 110. In another embodiment, as a portion of second layer 120 experiences tension, the portion can contract, such that projections tighten inward and increase in height. This auxetic behavior can also occur substantially independently of a first auxetic behavior of first layer 110.

One example of the possible change in configuration and/or auxetic behavior of first layer 110 and second layer 120 is presented in FIGS. 14 and 15. In FIG. 14, a "static" configuration, where article 100 is in a neutral or untensioned configuration. For example, FIG. 14 represents article 100 when being used in low-impact activities, such as standing or walking with relatively low impact forces being applied to sole structure 104. First layer 110 is disposed within and rests in a cavity of second layer 120 as described above and shown in FIG. 13. In this configuration, sole structure 104 has a first lateral width 1450.

Referring now to FIG. 15, a "dynamic" configuration is presented where higher impact forces are applied to sole structure 104. Specifically, a generally downward force applied to first layer 110 by (for example) a foot results in the downward compression of first layer 110 and second layer 120. As first layer 110 is compressed vertically—which in turn compresses second layer 120—the auxetic properties of each layer may produce a variety of different auxetic behaviors or responses. In FIG. 15, sole structure 104 expands to a second lateral width 1452. In other embodiments, the expansion response of each of first layer 110 and/or second layer 120 can differ from that depicted here.

Thus, FIG. 15 shows one example of how the auxetic geometry of first layer 110 and second layer 120 can change when sole structure 104 is under tension (tension indicated by the arrows). Because sole structure 104 is under vertical and/or longitudinal tension, regions where projections 150 are compressed in second layer 120 expand both longitudinally and laterally in response. Furthermore, regions in first layer 110 with apertures 130 may also expand both longitudinally and laterally in response to a longitudinal or vertical tension. While in some embodiments, the expansion may occur cooperatively, because of the loose coupling or fit between first layer 110 and second layer 120, the auxetic behaviors may generally occur independently of one another.

In some embodiments, the degree of expansion associated with first layer 110 as a result of the tension in FIG. 15 may be greater than the degree of expansion of second layer 120. In other embodiments, the degree of expansion associated with first layer 110 as a result of the tension in FIG. 15 may be less than the degree of expansion of second layer 120. Furthermore, in some embodiments, the degree of expansion associated with one particular region of first layer 110 as a result of the tension in FIG. 15 may be greater than the degree of expansion associated with the same region of second layer 120. In other embodiments, the degree of expansion associated with first layer 110 as a result of the tension in FIG. 15 may be substantially similar to the degree of expansion of second layer 120.

In different embodiments, the degree of contraction associated with first layer 110 as a result of the tension in FIG. 15 may be greater than the degree of contraction of second layer 120. In other embodiments, the degree of contraction associated with first layer 110 as a result of the tension in FIG. 15 may be less than the degree of contraction of second layer 120. Furthermore, in some embodiments, the degree of contraction associated with one particular region of first layer 110 as a result of the tension in FIG. 15 may be greater than the degree of contraction associated with the same region of second layer 120. In other embodiments, the degree of contraction associated with first layer 110 as a result of the tension in FIG. 15 may be substantially similar to the degree of contraction of second layer 120.

In addition, in some embodiments, an auxetic response—such as expansion or contraction—may only occur in first layer 110, and not in second layer 120. In another embodiment, an auxetic response—such as expansion or contraction—may only occur in second layer 120, and not in first layer 110.

Thus, in some embodiments, sole structure 104 can comprise a sole system that provides multiple layers of different auxetic responses. When first layer 110 exhibits a first auxetic behavior, second layer 120 may behave in a manner that is independent of the first auxetic behavior, and respond with a different, second auxetic behavior. The auxetic sole system may provide a wearer with different degrees of coverage in terms of cushioning and support. In some embodiments, sole structure 104 provides a user with a system that allows dynamic responses to the various motions of a foot. In one embodiment, the flexing and expansion of each of the first layer 110 and second layer 120 can occur in response to the various and dynamic pressure distributions that result from use by a wearer.

Figure 16:
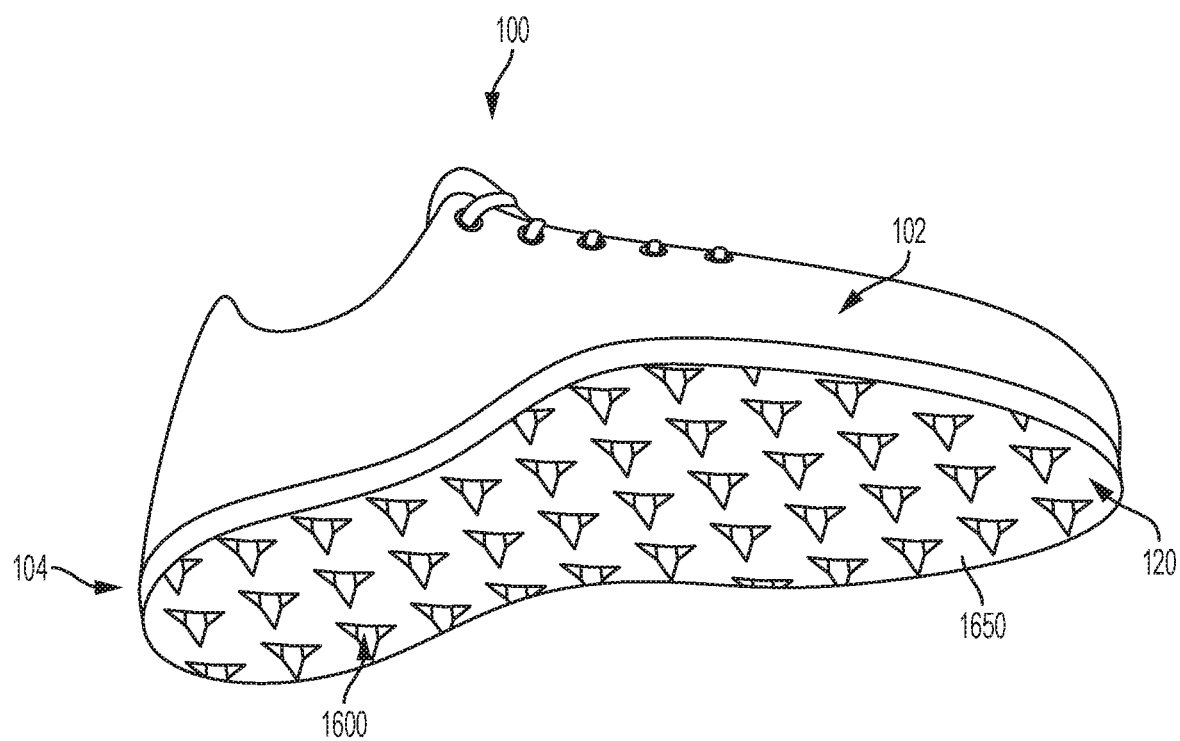
FIG. 16 is an isometric bottom view of an embodiment of an article of footwear.

FIG. 16 provides an illustration of sole structure 104 in assembled article 100. As shown in FIG. 16, second layer 120 provides an outermost layer in article 100. Thus, in some embodiments, second layer 120 can be configured as an outsole for an article of footwear. It can be further seen that, in some embodiments, an outer surface 1650 of second layer 120 can include depressions 1600 (e.g., hollowed regions, recesses, etc.) corresponding to the projections formed on the opposing surface, as discussed earlier herein. Furthermore, in some other embodiments, article 100 and sole structure 104 can include auxetic patterns, structures, features and/or behaviors described in the "Auxetic Structures and Footwear with Soles Having Auxetic Structures" application.

While various embodiments have been described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

What is claimed is:

1. A sole structure for an article of footwear comprising:
a first auxetic layer and a second auxetic layer;
wherein the first auxetic layer includes a plurality of blind-hole apertures extending through a portion of a thickness of the first auxetic layer and arranged to form a first auxetic structure;
wherein the second auxetic layer includes a plurality of projections arranged to form a second auxetic structure;
wherein the first auxetic layer is disposed on a top surface of the second auxetic layer;
wherein the plurality of apertures of the first auxetic layer is configured to receive the plurality of projections of the second auxetic layer such that at least a portion of each of the plurality of projections is spaced apart from a wall of a surrounding aperture to define a plurality of closed voids therebetween.

2. The sole structure according to claim 1, wherein the first auxetic layer has a first rigidity, wherein the second auxetic layer has a second rigidity, and wherein the second rigidity is greater than the first rigidity.

3. The sole structure according to claim 1, wherein the second auxetic layer is a ground-contacting outsole of the article of footwear.

4. The sole structure according to claim 1, wherein the second auxetic layer includes a cavity configured to receive the first auxetic layer.

5. The sole structure according to claim 4, wherein the first auxetic layer includes a first tapered sidewall and a second tapered sidewall, wherein the cavity includes a third tapered sidewall and a fourth tapered sidewall, and wherein the first auxetic layer is secured in the cavity by contact between the first tapered sidewall and the third tapered sidewall and contact between the second tapered sidewall and the fourth tapered sidewall.

6. An a sole structure for an article of footwear comprising:
an insole and an outsole;
wherein the insole includes a bottom surface, wherein the bottom surface of the insole includes a plurality of apertures arranged to form a first auxetic structure;
wherein the outsole includes a top surface, wherein the top surface of the outsole includes a plurality of projections arranged to form a second auxetic structure;
wherein the bottom surface of the insole is disposed adjacent to the top surface of the outsole;
wherein each projection of the plurality of projections is configured to extend upward and into a corresponding aperture of the plurality of apertures when the bottom surface of the insole is disposed adjacent to the top surface of the outsole, and wherein each projection includes a portion that is spaced apart from a wall of the aperture within which it extends;
wherein the insole has a first insole sidewall and a second insole sidewall, wherein the first insole sidewall is tapered and wherein the second insole sidewall is tapered;
wherein the insole is configured to fit within a cavity of the outsole, wherein the cavity has a first cavity sidewall and a second cavity sidewall, wherein the first cavity sidewall is tapered and wherein the second cavity sidewall is tapered;
wherein the first cavity sidewall is in contact with the first insole sidewall when the insole is disposed in the cavity, wherein the second cavity sidewall is in contact with the second insole sidewall when the insole is disposed in the cavity; and
wherein the insole is secured within the article of footwear by the contact between the first insole sidewall and the first cavity sidewall and by the contact between the second insole sidewall and the second cavity sidewall.

7. The sole structure according to claim 6, wherein a first aperture of the plurality of apertures has a first polygonal cross-sectional shape taken along a plane parallel with a surface of the insole, and wherein a first projection of the plurality of projections has a second polygonal cross-sectional shape taken along the plane parallel with the surface of the outsole.

8. The sole structure according to claim 7, wherein the first polygonal cross-sectional shape is different than the second polygonal cross-sectional shape.

9. The sole structure according to claim 7, wherein the first polygonal cross-sectional shape is similar to the second polygonal cross-sectional shape.

10. The sole structure according to claim 7, wherein the first polygonal cross-sectional shape is a tri-star shape and wherein the second polygonal cross-sectional shape is a tri-star shape.

11. The sole structure according to claim 6, wherein an outer surface of each projection of the plurality of projections is configured to be spaced apart from an inner surface of the corresponding aperture of the plurality of apertures when the bottom surface of the insole is disposed adjacent to the top surface of the outsole.

12. The sole structure according to claim 6, wherein the plurality of projections are arranged along a forefoot portion, a midfoot portion, and a heel portion of the outsole.

13. The sole structure of claim 6, wherein the plurality of apertures are blind-hole apertures.

14. The sole structure of claim 13, wherein the insole and outsole define a plurality of closed voids therebetween, each void being defined between a respective projection of the plurality of projections and a respective aperture of the plurality of apertures.

* * * * *